US006419856B1

(12) United States Patent
Cirrito et al.

(10) Patent No.: US 6,419,856 B1
(45) Date of Patent: Jul. 16, 2002

(54) METHOD AND APPARATUS FOR TOTAL ENERGY FUEL CONVERSION SYSTEMS

(75) Inventors: Anthony Cirrito, East Sandwich, MA (US); Bernard Ennis, Cedar Grove, NJ (US)

(73) Assignee: EGT Developments, LLC, Cedar Grove, NJ (US)

( * ) Notice: Subject to any disclaimer, the term of this patent is extended or adjusted under 35 U.S.C. 154(b) by 0 days.

(21) Appl. No.: 09/276,874

(22) Filed: Mar. 26, 1999

Related U.S. Application Data

(62) Division of application No. 08/771,875, filed on Dec. 23, 1996, now Pat. No. 5,938,975.
(51) Int. Cl.$^7$ .................................................. C07C 1/02
(52) U.S. Cl. ........................................ 252/373; 423/439
(58) Field of Search ............................ 423/439; 252/373

(56) References Cited

PUBLICATIONS

Dente, M., Ranzi, E. and Barendregt, S., "Adiabatic Cracking Yields Theoretical Predicted", presentation at the 1981 AIChE Meeting, New Orleans, USA, Jul. 1981.*

* cited by examiner

*Primary Examiner*—Samuel Barts
*Assistant Examiner*—Elvis O. Price

(74) *Attorney, Agent, or Firm*—Schnader Harrison Segal & Lewis LLP

(57) ABSTRACT

An independent and conserved source of fuel and/or power comprises a top stage rocket engine firing up to 5000 F. at very high pressures, delivering jet flows up to transonic velocities into a near adiabatic tunnel for mixing in general and/or for transforming reactants introduced selectively. The related compression is supplied by an independent prime mover which compresses its exhaust and other recoverable fluids. Low grade flows, thereby upgraded in temperature and pressure, are adiabatically contained, are further upgraded in the tunnel to become part of the prescribed fuel for export at the tunnel ends; or fuel to be fired in a prime mover for electric or other power; or hydrogen for chemical use. Expansion turbines for this purpose are relieved of the load used to compress the excess air in standard gas turbines thus increasing export power. A portion of the expansion turbine's exhaust becomes part of recoverable fluids. When oxygen is used instead of air, the gases through turbines are nitrogen-free with more heat capacity reducing turbine inlet temperatures for the same power. When reactant transformation is specified, the larger water vapor content in the cycle enhances the water gas/shift autothermally for ammonia and/or power and alternatively at lower pressures for pyrolysis cracking for olefins and diolefins. Further, staging rocket engine reactors increases efficiency in boilers and steam turbines; and staging can produce sponge iron and iron carbide selectively with expansion turbine power and fuel cells for peak and off-peak loads.

34 Claims, 8 Drawing Sheets

Rocket Engine Power Source

Rocket Engine Power Source for Expansion Turbines
Case 1– Single and Multi Stage– Turbines Rocket Engine Power Source for Expansion Turbines
Case 2— Turbine With Parasitic Shaft Work Rocket Engine Power Source for
Expansion Turbines
Case 3– Multiple Turbine Arrangements Rocket Engine Power Source and
Base and Peak Load Turbine–Fuel Cell System
Case 4

Rocket Engine Power Source Using
Two Stage Fuel Transformation
Case 5

Boiler Arrangement With Hot Flow Extension
Case 6

Rocket Engine Power Source
Pyrolysis and Fuel Transformation
Process for Ethylene and Syngas

METHOD AND APPARATUS FOR TOTAL ENERGY FUEL CONVERSION SYSTEMS

"This is a divisional of application Ser. No. 08/771,875 filed on Dec. 23, 1996 now U.S. Pat. No. 5,938,975."

BACKGROUND OF THE INVENTION

1. Field of the Invention

This invention relates to conservatively transforming carbonaceous matter into fuels and petrochemicals for power and other purposes.

2. Description of the Prior Art

There have been many attempts to improve the efficiency of power generation systems in order to reduce the fuel consumption/power generated ratio, and to reduce environmental pollution from combustion products. Some of those attempts include gas turbine blade cooling, combined cycle heat recovery, and the Humid Air Turbine (HAT) cycle. For example, U.S. Pat. No. 4,829,763 discloses an intercooled, regenerative cycle with a saturator that adds considerable moisture to the compressor discharge air so that the combustor inlet flow contains 20 to 40% water vapor. The water vapor adds to the turbine output while the intercooling reduces the compressor work requirement which result in higher specific power. The compressed air which is used for combustion of the fuel to drive the turbine is cooled then humidified prior to combustion in a multistage counter-current saturator with the aforementioned water vapor. Low level heat is rejected from the compressed air during intercooling and prior to humidification. The HAT cycle is an improvement in thermal efficiency compared to the combined cycle, the steam injected cycle, the intercooled regenerative cycle and other humidification based processes. The HAT cycle requires very high air pressures up to 30 atmospheres and higher turbine inlet temperatures up to 2800 F. to improve overall plant thermal efficiencies.

Another system is considered to be an extension to the HAT cycle, and is called the Integrated Gasification Humid Air Turbine (IGHAT) has been described by Day and Rao as a method of coal gasification based power generation that could provide high efficiency and low emissions at least comparable to an integrated gasification combined cycle (IGCC) but without the penalty of high capital cost that is usually associated with IGCC systems. Much of the cost savings from IGHAT comes from the fact that the HAT cycle can use low level heat from gasification quench water in an efficient way via the saturator, whereas in an IGCC one must recover as much heat as possible from the raw coal gas in the form of high temperature and high pressure steam, using relatively expensive waste heat boilers. Additional cost savings occur because the cycle does not require a steam turbine condenser. Further, the large amount of water vapor mixed with combustion air is expected to reduce $NO_x$ emissions to very low levels, assuming suitable combustion can be achieved at reduced flame temperatures.

Harvey et al., describe a process for reducing combustion irreversibility through off-gas recycling. The process has no bottoming cycle which is similar to a gas turbine with intercooling, reheating and a regenerator. The regenerator functions as a reformer wherein the fuel is cracked and partly oxidized by heat from the recycled turbine off-gases. The off-gases contain oxygen and thus are used as oxygen carriers. Before each turbine stage, air is injected into the gas stream containing reformed fuel and recycled off-gases which are thereby sequentially fired. The water vapor in the off-gases is partially liquefied in the series of water-cooled condensers after each stage; intercooling is accomplished by injection of the water. Analysis by Harvey, et. al. shows reforming for fuel conversion, but the gains presented were limited by pinch point temperature in the reformer. Harvey, et al. plan further study of the effect of their proposed arrangement on efficiency at turbine inlet temperatures below 2300 F., which in the analysis is the approximate high limit without turbine blade cooling.

To control turbine inlet temperature within acceptable metallurgical limits (now 2600–2800 F.) gas turbine designers have resorted to excess combustion air, diluents such as steam as in HAT or simple steam injection, water injection or compressor intercooling. Concurrently metallurgists are working to develop ceramic components or coatings which can tolerate ever higher temperatures. This invention achieves turbine inlet temperature control by turbine exhaust recycle with consequential high system cycle efficiencies. Capital is reduced by rocket engine reactor compactness and elimination of combined cycle equipment and its related efficiency reducing system infrastructure. In dealing with the exhaust from steam turbines, this invention utilizes much of the latent heat in the exhaust with consequent reduction in the cooling water load otherwise required for condensing steam for boiler feed water.

It is therefore an object of the present invention to provide a method of generating power from fuel with improved efficiency over prior methods, employing conventional turbine inlet temperatures without diluent injection or intercooling. Another object is to provide apparatus for generating power from fuel in a more flexible, efficient and less polluting manner than prior art methods, at reduced capital cost.

This invention can also be used as a pyrolysis reaction system to carry out either moderate temperature conventional pyrolysis or high temperature total pyrolysis. U.S. patents by Raniere, et al. U.S. Pat. No. 4,724,272 and Hertzberg, et. al. U.S. Pat. No. 5,300,216 teach that heating and quench in transonic flow must be accomplished at precise residence times with respect to shock type and shock location. Both hydrocarbon and steam are heated and passed through separate supersonic nozzles before pyrolysis. Hertzberg further teaches that, after quenching, the cracked gases may be passed through a turbine for energy recovery and further cooling.

With this invention combined fuel conversion transformations and pyrolysis are also possible. U.S. Pat. Nos. 4,136,015 and 4,134,824 by Kamm, et. al. teach a process for thermal cracking of hydrocarbons and an integrated process for partial oxidation and thermal cracking of crude oil feed stocks. Hydrogen available from heavy oil partial oxidation promotes yield selectivity. Moderate time-temperature cracking conditions are selected which result in substantial liquid product and tar yields which must be handled with difficulty within their process and in downstream processes.

It is therefore an object of this invention to provide a method of pyrolyzing and hydropyrolyzing carbonaceous matter either alone or in combination with fuel conversion transformations at moderate or high temperatures and pressures, achieving near total feed stock conversion, in a near total energy conservation arrangement. Another object of this invention to provide apparatus for pyrolyzing and hydropyrolyzing carbonaceous matter either alone or in combination with fuel conversion transformations at moderate or high temperatures and pressures, achieving near total feed stock conversion, in a near total energy conservation arrangement.

SUMMARY OF THE INVENTION

These objects, and others which will become apparent from the following disclosure, are achieved by the present invention which comprises in one aspect a process of producing power comprising:

providing a turbine adapted to generate shaft work, said turbine having a combustor; and a rocket engine having a nozzle and a compressor means;

feeding fuel and oxidant to the rocket engine and the rocket engine compressor means;

feeding carbonaceous matter and water and/or steam to the rocket engine nozzle;

processing the output of the rocket engine nozzle into fuel for the turbine;

introducing said fuel and oxidant for the turbine to the turbine combustor to produce carbon dioxide and water combustion products;

passing said combustion products through the turbine;

recycling a substantial portion of the hot exhaust from the turbine to the rocket engine compressor means;

further recycling the hot exhaust from the rocket engine compressor means to the rocket engine nozzle; optionally into one or more secondary port downstream from said nozzle; and optionally as a compressed flow for other uses.

controlling the inlet temperature to the turbine.

In another aspect, the invention comprises apparatus for generating power from fuel comprising:

a turbine having a combustor;

a rocket engine having a nozzle and a compressor means;

means for adding carbonaceous matter and water and/or steam to the rocket engine nozzle;

means for feeding fuel and oxidant to the rocket engine and to the rocket engine compressor means;

means for processing the output of the rocket engine nozzle into fuel for the turbine combustor;

means for introducing said fuel and oxidant for the turbine to the turbine combustor to produce carbon dioxide and water combustion products;

means for recycling a substantial portion of the hot exhaust from the turbine to the rocket engine compressor means;

means for further recycling the hot exhaust from the rocket engine compressor means to the rocket engine nozzle; optionally into one or more secondary ports downstream from said nozzle; and optionally as a compressed flow for other uses; and controlling the inlet temperature to the turbine;

Another aspect of the invention is an alternative process of producing power comprising:

providing a steam turbine adapted to generate shaft work; and a rocket engine having a nozzle and a rocket engine compressor means;

feeding fuel and oxidant to the rocket engine;

feeding carbonaceous matter and water and/or steam to the rocket engine nozzle;

processing the output of the rocket engine nozzle into fuel for a boiler and fuel for a second rocket engine;

boiling water in said boiler to produce water vapor;

using the resultant water vapor to power said steam turbine;

quenching the turbine outlet steam with water; recycling the cooled steam and water mixture to the rocket engine nozzle; and transforming the output of the second rocket engine into a fuel product.

DETAILED DESCRIPTION OF THE INVENTION AND THE PREFERRED EMBODIMENTS

Figure 1:
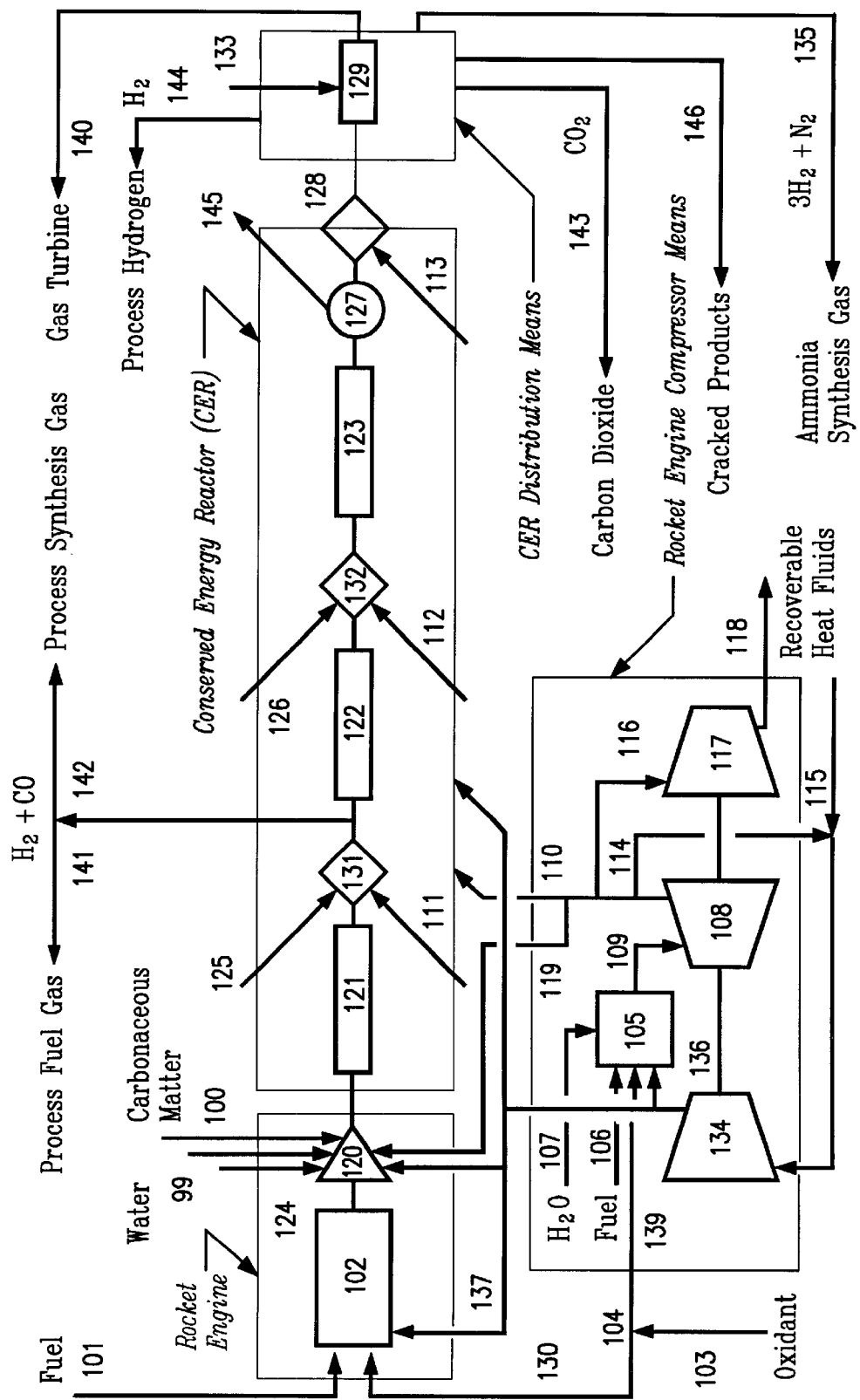
FIG. 1 is a diagram of a rocket engine power source comprised of a rocket engine, a rocket engine compressor means, a conserved energy reactor and a distribution means.

The process of producing power comprises:

providing a turbine adapted to generate shaft work, said turbine having a combustor; and a rocket engine having a nozzle and a compressor means;

feeding fuel and oxidant to the rocket engine;

feeding carbonaceous matter and water and/or steam to the rocket engine nozzle;

processing the output of the rocket engine into fuel for the turbine combustor;

introducing said fuel for the turbine to the turbine combustor;

passing combustion products through a turbine; and recycling a substantial part of the hot exhaust from the turbine to the rocket engine compressor means:

further recycling of the exhaust from the rocket engine compressor means to the rocket engine nozzle; optionally one or more secondary ports downstream from said nozzle; and optionally a compressed flow for other uses; and controlling the inlet temperature to the turbine.

Suitable gas turbines adapted to generate shaft work include standard and advanced commonly available gas turbines manufactured by GE, ABB, Solar, Siemens and others.

Suitable gas turbine combustors include combustors provided with the gas turbines or those specially designed for high steam operation.

Suitable rocket engines include jet engines manufactured by GE, Pratt & Whitney, Rolls Royce and others; and burners made by T-Thermal, John Zink and others; and jet and rocket engines made by manufacturers of propulsion systems for magnetohydrodynamic generators up to 5000 F. stagnation temperatures such as TRW.

Suitable nozzles for rocket engines include deLaval type contracting/expanding nozzles.

Suitable fuels for the rocket engine include methane, natural gas and petroleum distillates.

Suitable oxidants for the rocket engine reactor include air and oxygen.

Suitable processing the output of the rocket engine nozzle into fuel for the turbine combustor includes one or more near-adiabatic tunnels and nozzles sized to generate one or more shock waves and produce jet propulsions to boost flow energy.

Suitable temperatures for introducing fuel for the turbine to the turbine combustor so that turbine inlet temperature is controlled within existing materials limitations, i.e., up to 2800 F. for new gas turbines.

Suitable means for recycling hot exhaust from the turbine to the rocket engine compressor include gas turbines, turbochargers, diesel engines and other internal combustion engines.

Preferably the output from said rocket engine nozzle and said recycled hot exhaust gas from said turbine are transformed in a near-adiabatic atmosphere into said fuel for said turbine. By near-adiabatic atmosphere is meant that heat content of fuel gas, oxidant, carbonaceous matter and water being fed are preserved except for unavoidable radiation or other losses to the environment.

In certain embodiments, carbonaceous matter is introduced into said output of said rocket engine reactor downstream of said nozzle at velocities sufficient to transform said carbonaceous matter into said fuel for said turbine. Suitable velocities for such transformation include sub-sonic and supersonic flow up to Mach 2 and higher to complete reactions and deliver flow at turbine inlet pressure.

The carbonaceous matter is preferably methane, but can alternatively be natural gas and its components, petroleum coke, residua or distillates, biomass, coal, char or other chemicals suitable for pyrolysis or combustion. Preferably said fuel is also methane.

In some embodiments a portion of said hydrogen is diverted to one or more downstream uses, for example fuel cells, iron oxide reduction reactors, or chemical processes such as petroleum distillate hydrodesulfurization, hydrogenation of unsaturated hydrocarbons, ammonia and alcohol production, etc. In some embodiments, a portion of said hydrogen or other fuel is recycled by suitable means to fire rocket engine and downstream jet propulsions.

When the transformation occurs in a group of transformation reactors it is preferred that the pressure in said output of said rocket engine compression means conforms by suitable means with the pressure in each transformation reactor.

In certain embodiments a portion of said hot exhaust from said turbine combustor is compressed in an intermediate compressor and recycled directly to a short circuit distribution means and delivered as heat and mass additions at least matching or boosting pressure, jet-like, at suitable junctures augmenting said hot exhaust.

Generally, the output of said rocket engine nozzle exits from said nozzle at transonic speeds. By transonic speeds is meant near sonic and supersonic up to Mach 2 and higher, suitable to the process reactions and maintenance of designed flow energy level.

When reaction severity or selectivity in the transformation reactor or series of reactors needs to be increased or when more mild operations conditions are desired, catalyst for said transformation is introduced into said output of said rocket engine nozzle. Suitable catalysts include manganese oxide and zinc titanate.

The shaft work of the turbine can be for electrical generation only, or can also include work to operate one or more compressors or pumps.

One or more turbines, one or more combustors, and one or more electrical generation means are possible.

In certain embodiments, supplemental or interstage oxidant is added to said turbine combustor(s). The oxidant can be introduced in said turbine combustor(s) to effectively control turbine inlet temperature. Suitable temperatures for turbine blades and components are about 1700 F. for older gas turbines up to about 2800 F. for current state of the art designs. Turbine inlet temperature can be increased consistent with improvements in materials technology for higher temperature and higher efficiency operations.

Generally one product of said transformation is hydrogen. Other products can be carbon dioxide, carbon monoxide, and water vapor, for example.

Another embodiment of the invention is a process of producing power comprising: providing a steam turbine adapted to generate shaft work; and a rocket engine having a nozzle and a compressor means;

feeding carbonaceous matter and steam to the rocket engine nozzles;

feeding fuel and oxidant to the rocket engine;

processing the output of the rocket engine nozzle into fuel for a boiler and fuel for a second rocket engine;

boiling water in said boiler to produce water vapor;

using the resultant water vapor to power said steam turbine;

quenching the turbine outlet steam with water; and recycling the cooled steam and water mixture to the rocket engine nozzle; and transforming the output of the second rocket engine into a fuel product. The fuel product generally comprises hydrogen.

In some embodiments clean water is introduced into said transformation reactor or group of transformation reactors, thereby reacting in said reactor or reactors with said output of said rocket engine. Preferably, the clean water is introduced in an approximately equal or greater weight ratio with the steam turbine exhaust.

Preferred embodiments of this aspect of the invention include providing a heat exchanger; a third rocket engine having a nozzle; a gas turbine having a combustor; feeding fuel and oxidant to said third rocket engine; directing the output of said third rocket engine nozzle into said heat exchanger so as to cool said output and to super-superheat steam from said boiler; and transferring the resultant super-superheated steam to said steam turbine.

One suitable apparatus for generating power from fuel according to the invention comprises: a gas turbine having a combustor; a rocket engine reactor having a nozzle and a compressor; means for feeding fuel and oxidant to the rocket engine;

means for processing the output of the rocket engine reactor into fuel for the turbine combustor; means for introducing said fuel for the turbine to the turbine combustor;

means for recycling hot exhaust from the turbine to the rocket engine compressor means;

means for further recycling the exhaust from the rocket engine compressor means to the rocket engine nozzle; optionally the secondary ports downstream from said nozzle; and optionally as a compressed flow for other uses; and for controlling the inlet temperature to the gas turbine.

The high pressure high temperature gas turbines being developed may, with cost effective revisions, may be retrofitted according to this invention to increase their thermal efficiencies. Perhaps the greatest retrofit gains will redound to the many heavy-duty, low efficiency, stationary gas turbines already installed and operating in a lower temperature range. Apart from the heat recovery via conserved recycle recompression, the implementation of the independently powered compressor can completely eliminate the work of compression from the output power expansion turbine, thereby increasing its output net work and mechanical efficiency. This same gain is accordingly obtained with a new installation.

This invention achieves turbine inlet temperature control by turbine exhaust recycle with consequential high system cycle efficiencies. Capital is reduced by rocket engine reactor compactness and elimination of combined cycle equipment and its related efficiency reducing system infrastructure. Nitrogen oxides normally associated with hydrogen production by steam reforming are reduced due to high steam, low air or nitrogen free reaction conditions and increased thermal cycle efficiency.

As mentioned, the invention comprises recycling a substantial part of the exhaust gases from an expansion power turbine; augmenting them with fuel additions and the combustion products of said fuel additions for compressing them; recompressing them in an independent heat conserving, staged jet compression process and returning them to the expansion power turbine; reacting said gases in a topping compression stage with a rocket engine-driven water-gas shift hydrocarbon transforming and/or water gas shift reactor (hereinafter referred to as the conserved energy reactor), for added thermochemical conversion resulting in recyclable fuel and extra fuel for other purposes outside the expansion power cycle; and; modulating turbine inlet temperature by controlled recycling of augmented turbine exhaust flows. The present invention extends the art by improving efficiency, reducing gasification capital and minimizing environmental pollution; and adds capabilities beyond the state of the art by carrying out the shift and other transforming reactions in another conserved energy reactor.

Shift reaction converts carbon monoxide to carbon dioxide and additional hydrogen. Sequential conserved energy reactor designs will further reduce capital and improve process plant and power generation economics.

Referring now to the drawings, FIG. 1 show carbonaceous matter 100 and water 99 as feeds to the secondary ports of rocket engine nozzle 120. A rocket engine 102 is fueled through line 101, preferably methane. The oxidant, preferably air, is delivered to rocket engine 102 at top pressure via line 103 from the oxidant source. Oxidant is optionally branched on line 104 to gas turbine combustor 105. Combustor 105 is also fired with fuel 106 to control the turbine inlet turbine inlet temperature in combination with water 107.

Hot exhaust gases from combustor 105 expand through gas turbine 108. The exhaust from the turbine in line 109 can be directed as 110 into any one or more of secondary ports to downstream nozzles via related lines 111, 112 and 113; or a portion or all of it as 114 can be branched off to join and become recoverable heat fluids carried in line 115. As an alternate to the flow in 114, the flow 116 into compressor 117 delivers the flow as 118 at system pressure to accommodate heat and mass balance for the cycle. A further branch 119 can be directed to the secondary port of nozzle 120. Transforming reactors 121, 122 and 123 respectively represent water-gas, shift, and extended residence time zones where transformation of rocket engine exhaust occurs. These zones can be programmed optionally as sequential transonic shock zones or simply as two or more residence time zones. Down-stream thrusts can be programmed by after-jet combustion by introducing oxidant through lines 124, 125 and 126 to fire with unreacted carbonaceous matter.

Un-utilized lines among 111, 112, 113, 124, 125 and 126 can be programmed to introduce other reactive matter. The extent of the uses depends on the reactivity of the compounds present. A clean reactant for conversion, methane for example, into an auxiliary port of nozzle 120 may require no more than two reaction zones. A pre-cleaned coal or petroleum coke could require an additional zone. Solid feed stocks additionally require the separation of particulates from the flow which would take place in particle separator 127. Another use for separator 127 can be to recover particles secondarily entrained for any one of the following functions by discharging:

1. Catalyst Particles;
2. Getter Minerals for alkali metal capture in biomass processes;
3. Sulfur Capturing Seeds like manganese oxide or zinc titanate for coal, coke and residual oils;
4. Iron Particles for Steam Iron Reactions to produce sponge iron, produce hydrogen for fuel cells and other uses, and to recycle-reduce iron oxides;
5. Other Metal Particles like tin and zinc for thermo-chemical reactions; and
6. Neutral Particles for heat transfer to lighter faster flowing particles, gases and vapors.

Any one or more of the above can be introduced by entrainment in a fluid that is chemically compatible to the process. Some processes may require at least one more separator 127 which may be in a cascade series manifolded so that the product gas flows totally into nozzle 128 which can serve as a back pressure for the following process uses natural gas, cleaned or pre-cleaned carbonaceous matter is converted for direct combustion for turbine expansion, or an integrated fuel cell/turbine process. One capability of the rocket engine driven reactor train is to produce a fuel gas to be used directly in combustion, as in later embodiments. Another capability of the rocket engine driven reactor train is to force the reactions to completion towards the lowest reaction end temperature by programmed, metered and controlled reactant feeds. This is useful when maximum hydrogen production is desired for subsequent chemical use. Most conversion reactors in practice quench the reaction to preserve its final chemical composition. By contrast, when appropriate this invention fires the product gas at the end of the reaction for the stoichiometrically prescribed reaction end temperature which ends at station 129 of the conserved energy reactor distribution means.

On the other hand, when the reaction end temperature does not conform to still lower temperatures required by downstream processing, then the reaction must be quenched. Conversely, a process such as pyrolysis can require quenching to interrupt a reaction sequence and freeze desired intermediate chemical species. Examples would include cracking of methane to produce acetylene and ethylene; cracking of ethane to produce ethylene; and cracking of propane, butane and petroleum distillates to co-produce hydrogen, ethylene, propylene, butylene, butadiene and other diolefins, and aromatic compounds.

When oxygen is the oxidant of choice and its source is available over the fence at pressure for the process, the need for a separate oxygen compressor means is eliminated. Otherwise a compressor means can serve to boost the pressure of the oxygen.

Line 130 shown branching off oxidant source is to provide oxygen or air to any one or more of the secondary ports to nozzle stations 120, 131, 132 and 128 for increasing the thrust in the flow by after-jet combustion. An ignition source is provided when the flow on contact is below the auto-ignition or reaction temperature. Ignition lines are not shown but are similar to line 133. The function of after jet combustion is to boost entrainment, create shock, and/or make up for friction head loss to maintain pressure at station 129.

Compressor 134 is shown powered by combustor 105 and turbine 108. However compressor 134 can be powered by any prime mover, a diesel engine for example, providing preferably that its fuel composition is chemically compatible with flow in the conserved energy reactor; otherwise the exhaust must be exported for recovery uses.

Standard equilibrium plots are used as guidelines for starting and running the conversion process so as to avoid the formation of solid carbon or coke.

This process has the capability for making extra products, for example, synthesis gases for ammonia or alcohols, pyrolysis cracked gases for ethylene and petrochemicals can be produced.

Typical Baseline Reactions for the Conserved Energy Reactor

The following are the main equations which relate selectively to any embodiment incorporating the conserved energy reactor described with respect to FIG. 1. The basic equations are as follows:

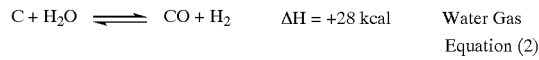

$$C + H_2O \rightleftharpoons CO + H_2 \quad \Delta H = +28 \text{ kcal} \quad \text{Water Gas} \quad \text{Equation (1)}$$

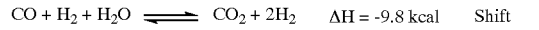

$$CO + H_2 + H_2O \rightleftharpoons CO_2 + 2H_2 \quad \Delta H = -9.8 \text{ kcal} \quad \text{Shift} \quad \text{Equation (2)}$$

$$CH_4 + H_2O \rightleftharpoons CO + 3H_2 \quad \Delta H = +49.3 \text{ kcal} \quad \text{Equation (3)}$$

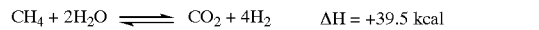

$$CH_4 + 2H_2O \rightleftharpoons CO_2 + 4H_2 \quad \Delta H = +39.5 \text{ kcal} \quad \text{Equation (4)}$$

FIG. 1 also shows how additional fuel can be produced in addition to increasing the efficiency of the power cycle. It shows the reactor discharging $3H_2+N_2$ as synthesis gases for the ammonia process and additional fuel as $H_2+0.333N_2$ which can be used for more steam or towards fueling the rocket engine for export within the plant.

The following two equations illustrate the basic autothermal reactions taking place in the reactor to produce these gases $$CH_4 + 2H_2O \rightleftharpoons CO_2 + 4H_2 \quad \Delta H = +39.5 \text{ kcal; and} \quad \text{Equation (4)}$$

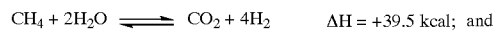

-continued $$0.176CH_4 + 2H_2O + 0.353O_2 + 1.333N_2 \longrightarrow 0.176CO_2 + 0.353H_2O + 1.333N_2 \quad \Delta H = -33.6 \text{ kcal} \quad \text{Equation (5)}$$

The sum of the reactions (4) and (5) yield the following:

| | |
|---|---|
| $4H_2 + 1.333N_2$ | Ammonia synthesis gases |
| $1.176CO_2 + 1.333N_2$ | Surplus fuel for increased stem flow and/or reactor recycle; or plant export |
| $1.176CO_2 + 1.333N_2$ | Also for plant export |

This is another special feature of this process i.e. the provision for making extra products. The synthesis gases for ammonia can also be produced in later embodiments employing gas turbines. The water gas shift equations (1) through (4) may be applied to all the embodiments of this invention depending on the carbonaceous matter to be converted. Methane or natural gas relate to equations (3) and (4) whereas coal, petroleum coke and biomass and residual oils can be processed via the water gas shift equations (1) through (2). The water gas reaction yields $H_2+CO$ generally from the first reactor and shown as lines 141 and 142 depending on the ultimate use as process fuel gas or synthesis gas. The significance of equilibrium in this invention is explained with respect to Equation 4 for example which produces four moles of hydrogen and one mole of carbon dioxide. For practical purposes a nearly straight line relationship holds in the positive $\log_{10} K$ scale from five to zero corresponding to temperatures respectively from 1600 K to 880 K (Wagman, et. al.), or 2400 F. to 1100 F. approximately. Higher temperatures of course also favor equilibrium. (Equilibrium constants by Wagman, et. al.)

In order to understand the particular significance of equilibrium with this invention is to conceptualize a very high temperature jet, say 4000 F., rich in steam progressively completing equilibrium particle by particle of interacting carbonaceous matter as they travel down the progressively decreasing $\log_{10}K$ function and corresponding temperatures down to 1100 F. and lower because it is possible with pressure to do so to a minor extent in the negative $\log_{10}K$ range. Driving to low temperature is beneficial if the fuel gas must be desulfurized. It also is sometimes useful in this case to separate the carbon dioxide from the hydrogen as shown with lines 143 and 144. A further advantage when driving a stoichiometrically specified reaction to completion at a low temperature is that less carbonaceous matter or fuel and less oxygen is required for the endothermic heat which results in less carbon dioxide in the off-gases.

On the other hand, if a pre-cleaned coal is the reactant, it can be useful to drive the reaction to a higher end temperature for use in turbine combustor 129, whereby the reaction is set by firing through line 133. However, a pre-cleaned coal generated fuel gas must have its fly ash removed in separator 127 through line 145 Before being fired in combustor 129.

Flexibility for Pyrolysis

This invention can also be used as a pyrolysis reaction system as shown in FIG. 1 to carry out either moderate temperature conventional pyrolysis or high temperature total pyrolysis. At moderate temperatures ethane, propane, butane and petroleum distillates may be cracked to produce ethylene and acetylene and other olefins and diolefins such as propylene, butylene, butadiene and aromatic hydrocarbon liquids. At high temperatures, methane may be cracked to produce mainly hydrogen, ethylene, and acetylene. Cracking non-methane hydrocarbons at high temperatures yields virtually total conversion to yield a product distribution largely free of the normally produced cyclic compounds, aromatics and heavy aromatic oils and tars.

U.S. patents by Raniere, et al, U.S. Pat. No. 4,724,272 and Hertzberg, et al. U.S. Pat. No. 5,300,216 teach that heating and quench in transonic flow must be accomplished at precise residence times with respect to shock type and shock location. Those skilled in the art know that rapid quench to a temperature about 1100–1300 F. is important to preserve yields of desired products and minimize coke formation.

The rocket engine 102 and nozzle section 120 of this invention coupled to reactors 121, 122 and 123 previously described represent a facility having flexible reactor length, capability for creating different shock characteristics along the reaction path and for quenching through ports 111, 112, 125 and 126 at different reaction time-temperature cracking severities. Many degrees of freedom are available since any one or more of said locations and including nozzle section 120 ahead of the selected quench locations can optionally be used for transonic mass inputs and heat additions to the main flow. Quenching can be total or partial and direct or indirect or a combination. Direct quench media may be water, steam, hydrocarbons and inert gases. Indirect quench is accomplished in a heat exchanger (not shown) at or near location 127 instead of the separator shown. The quenched cracked products are discharged through nozzle section 28 and distributed via line 146 to be further processed by suitable means.

Flexibility for Combined Production of Synthesis Gas and Cracked Products

U.S. Pat. Nos. 4,136,015 and 4,134,824 by Kamm, et. al. teach a process for thermal cracking of hydrocarbons and an integrated process for partial oxidation and thermal cracking of crude oil feed stocks. Moderate time-temperature cracking conditions are selected which result in substantial liquid product and tar yields which must be handled with difficulty within their process and in downstream processes.

With this invention, combined fuel conversion transformations and pyrolysis are also possible. High temperature operation is preferred so that complete breakdown and conversion of normally liquid or solid cracked hydrocarbon products is achieved. In combined mode synthesis gasses are first produced in one or more conserved energy reactors as previously described. Then, in a downstream conserved energy reactor, pyrolysis reactants are introduced to the high steam and high hydrogen synthesis gases flowing from the first conserved energy reactor and total pyrolysis is carried out as previously described. The presence of hydrogen in relatively large quantities during pyrolysis adds to yield selectivity towards desired products. The presence of steam in relatively large quantities during pyrolysis reduces tendency for soot or coke formation.

To further enhance reactivity, further accelerate heating rates and further improve selectivity towards desired cracked products supplemental oxidant may be added through available secondary nozzle ports. In combined fuel transformation—pyrolysis mode direct water quenching is preferred since the steam thus produced in situ is useful in generating turbine power. Cracked products are passed through a turbine for further cooling by isentropic extraction of work and flow to other conventional separation processes. Either high temperature or moderate temperature pyrolysis can be practiced depending upon feed stock, desired end products and economic factors. Direct or indirect or combination reaction quenching can be practiced depending upon feed stock, desired end products and economic factors.

Figure 8:
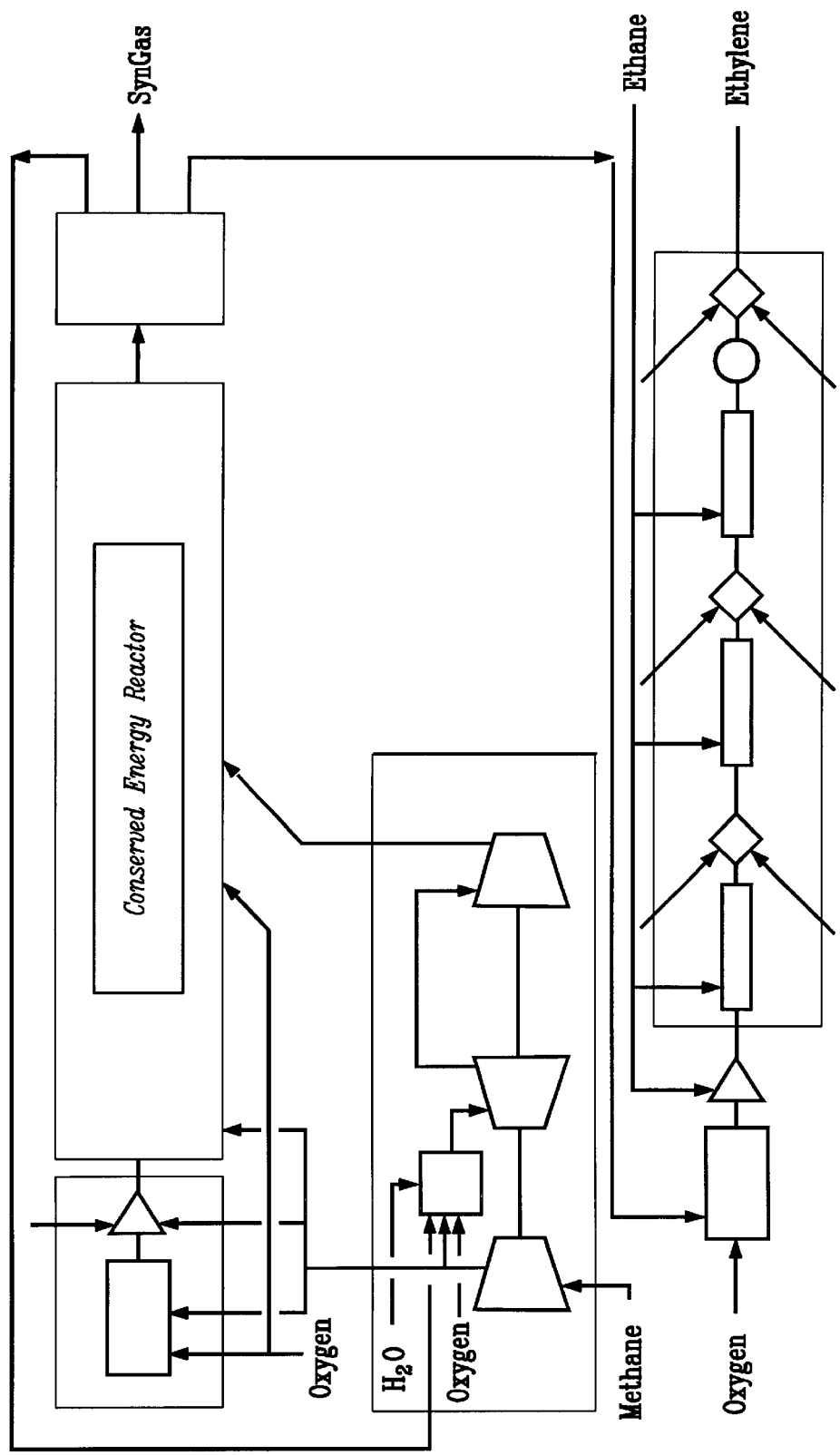
FIG. 8 is a diagram depicting two rocket engine power sources in a combined process for pyrolysis and fuel transformation to produce ethylene and synthesis gas.

FIG. 8 is a diagram of a pyrolysis and fuel transformation process for ethylene and synthesis gases. The process to be described is representative in general of producing other hydrocarbons. Methane is fed through compressor 134 and is distributed to suit a high pressure in line 800 into combustor 102, line 801, nozzle section 120 and line 802 as an option for after jet combustion. A fraction of the methane is fired with oxygen is combustor 102 for the endothermic requirement of the ensuing transformation reaction in the form of Equation (1)

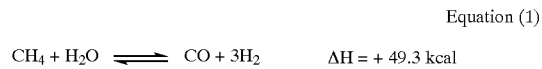

The remaining methane in combustor 102 serves to augment the mass of the jet. The synthesis gases produced in the conserved energy reactor is distributed to suit three different purposes:

1. A fraction is recycled to fuel combustor 105 of the rocket engine compressor means. The resulting exhaust from turbine 108 is recompressed by compressor 117 and is distributed along the reactor as shown;
2. A fraction is synthesis gas product; and
3. The remaining fraction is fed under pressure to a second stage rocket engine combustor and fired with oxygen to form the pyrolysis jet in the form and range of $$CO + 2H_2O \text{ TO } CO_2 + 3H_2O$$

to crack ethane for the production of ethylene as previously described.

As previously described, the combustor of the rocket engine can operate at stagnation temperatures up to 5000 F. and relatively unlimited stagnation pressures. The conserved energy reactor flexibility for shock location and down stream supplemental shocks were also described. As another note, methane, carbonaceous matter such as coal and residual oil may be processed which then produce syngas in the form and range of $$CO + H_2 \text{ TO } CO_2 + 2H_2$$

Finally, quenching to 1300–1000 F. is required with water, steam, a hydrocarbon or inert gas at the point of optimum cracking severity in order to freeze the desired intermediate reaction products. Any fly ash is removed in the separator at location 127.

Many other transformation reactions according to the invention take place at near sonic and supersonic conditions with high relative slip velocities between reactants which break into shock zones with ensuing subsonic flows. Intense reactivity is obtainable thereby with primary jet temperatures up to 5000 F. (practiced in magnetohydrodynamic flows) and unlimited high pressures for practical purposes.

Turning now to pressure, increased pressure is known to favor many chemical reactions. As noted earlier, low pressures are suitable for biomass gasification. It is also well known that biomass is much easier to gasify than coal with reactions occurring at lower temperatures and near atmospheric pressure. Coal is optimally processed at higher pressures.

This invention incorporates suitable alternatives for varying reactor pressure for conversion and at the same time conserves the rocket engine power source energy for conversion by the recycle function.

The distribution of pressure is as previously described with respect to FIG. 1 whereby the flow of recoverable heat fluids from compressor 134 is branched off to line 136 to supply combustor 105. The remaining flow is divided into a branch line 137 supplying rocket engine combustor 102 and branch line 138 to supply any one or more auxiliary ports down stream of power nozzle jet 120.

Flows in 137 and 138 are not necessarily fixed. Increasing the flow in 137 causes a corresponding decrease in 138. Being able to control this interchange allows more or less temperature in combustor 102 for whole or partial oxidation which can have the opposite effect from oxidant flow through branch 138, and this can be offset with more or less carbonaceous feed and water through lines 100 and 99.

A similar branching interchange is effected from exhaust line 109 from turbine 108. This was previously explained as a routine routing. This interchange significance reported here relates to recovery of exhaust heat and mass. In relatively low pressure operations all or most of the flow through line 109 can continue through line 110 and be distributed selectively along and down stream into the reactor. For process reasons or for a stronger entrainment effect the same flow can be redirected through line 119 where the combustion jet has the most entraining effect, which effect can be further amplified by increasing the temperature in combustor 102.

The need for directing the exhaust flow through line 116 to be mechanically compressed with the oxidant flow in line 139 through compressor 134 is less here because of the low pressure characteristic of the process. However, similar functions occur in later expansion turbine embodiments which operate as high as 30 atmospheres at station 129. Station 129 then serves as the high pressure high temperature combustor of the turbine. In that event recoverable heat fluids line 115 are replaced by a large portion of the exhaust which is recompressed along with the flow in line 116. Then the recoverable heat fluids supply to all combustors is from another source to be later described for the respective embodiments. In every case, however, power developed by the rocket engine and its compressor means must maintain in steady state recycle flow of consistent chemical composition in a near-adiabatic cycle while conserving a substantial portion of the exhaust energy for more efficiently powering an expansion turbine means which delivers mechanical power or electricity.

In this event to recover a substantial portion of the exhaust heat and mass, the flexibility afforded by the above described branching interchange options from line 109 will serve to optimize the recycle system to deliver a constant and consistent mass flow to combustor 129, here powering the expansion turbine means. Most of the heat returning through the system will convert carbonaceous matter to fuel gas for the combustor at station 129. Any additional sensible heat in the flow to station 129 is conserved to flow through the gas turbine 140. To prevent buildup in recycle, the necessary export carbon dioxide, nitrogen and minimal water vapor will serve to preheat fuel, recoverable heat fluids and other plant uses. These will be further described in their respective embodiments.

The invention can comprise expansion turbines; turbines with parasitic shaft work, and multiple turbine arrangements.

Case 1—Rocket Engine Power Source for Single and Multi-Stage Turbines

Figure 2:
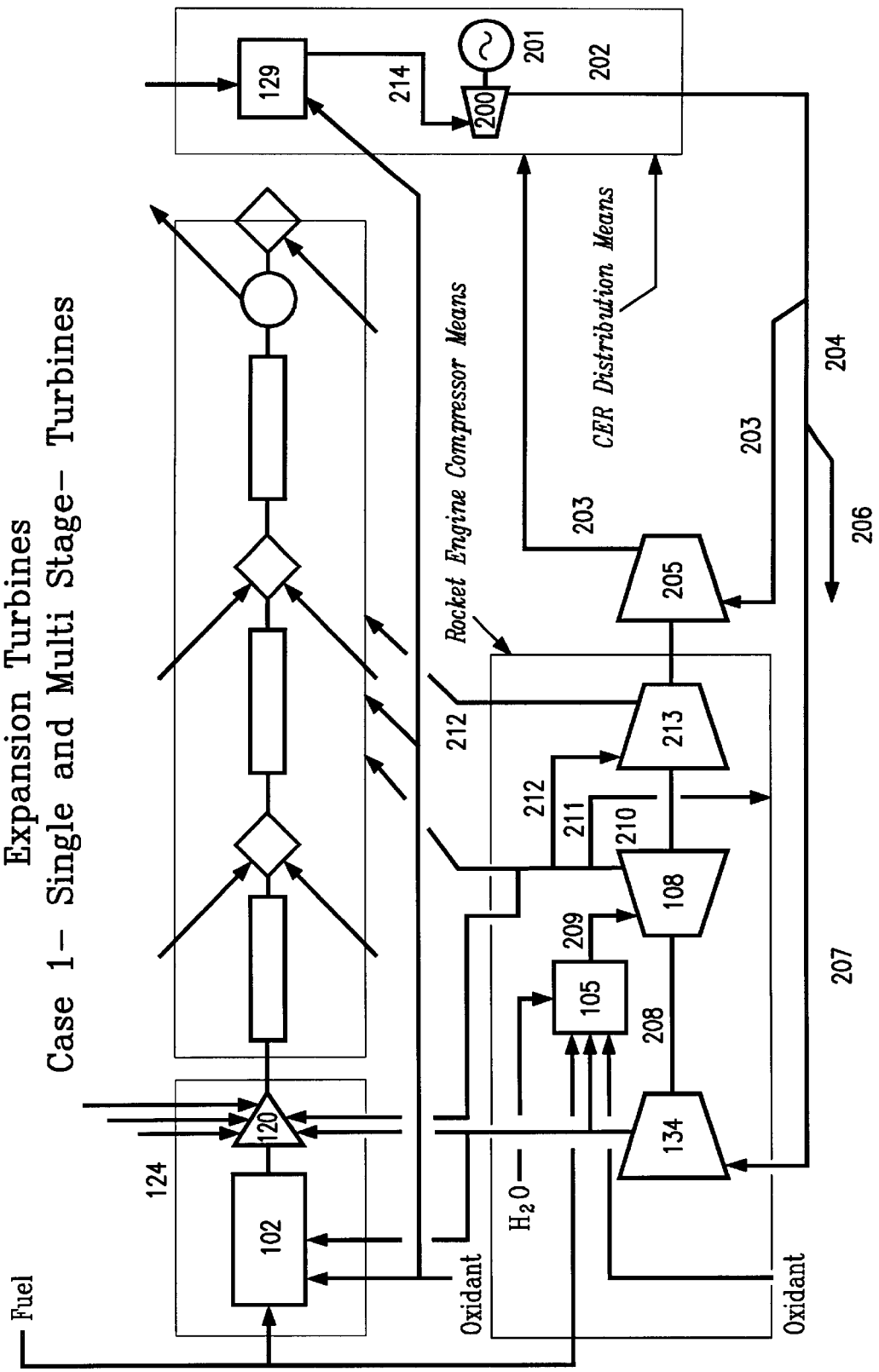
FIG. 2 is a diagram of a rocket engine power source flowing to an expansion turbine whose exhaust is recompressed by a prime mover so that most of the compressor discharge is effectively recycled to a conserved energy reactor.

In FIG. 2 combustor 129 for the expansion turbine means 200 delivering power to generator 201. Any mechanically transmitted power load can be used. The turbine means can be a single turbine, a straight multi-stage turbine, or a multi-stage turbine with interstage heating. Preferably, the source of temperature and pressure which developed in combustor 129 is the rocket engine power source previously described with respect to FIG. 1. The rocket engine power source also includes the conserved energy reactor or transformer. Its function is not only to transform carbonaceous matter introduced through line 124 into a usable product fuel gas into combustor 129 but to convert all or most of the power expended in compressing and heating in the rocket engine compressor means, rocket engine and conserved energy reactor together into product fuel gas (and its sensible heat) flowing into combustor 129.

The encompassing function of this embodiment is to recycle a substantial portion of the exhaust part from the last turbine of said expansion means, except what must be exported from the cycle (at least for direct heat and mass transfer) to prevent build-up in the process. Accordingly, the exhaust 202 branches off at 203 and continues on as 204 after being increased in pressure through compressor 205, for interstage heating in turbine means 200. Compressor 205 to be powered by turbine 108 can be independently speed controlled by a suitable means.

It is essential that the mass and chemistry of the greater or overall cycle remain at steady state; so export mass 206 must be replaced by an equivalent mass with a conforming aggregate chemistry for continuity. For example, if $CH_4$ is the fuel of choice, reaction in combustor 129 is organized as follows:

$$CH_4 + 2\ Air + x\ recycle \rightleftharpoons CO_2 + 2H_2O + 7.5N_2 + x Recycle \quad \text{Equation (1)}$$

where Recycle=$CO_2+2H_2O+7.5N_2$ and where x is higher the lower the design turbine inlet temperature, whereby x ($CO_2+2H_2O+7.5N_2$) can substitute for any excess air firing in common practice. Equation (1) is rewritten as follows when oxygen is the preferred oxidant:

$$CH_4 + 2\ Oxygen + x\ Recycle \rightleftharpoons CO_2 + 2H_2O + x Recycle \quad \text{Equation (2)}$$

where Recycle=$CO_2+2H_2O$ whereby x ($CO_2+2H_2O$) is the substitute for the excess air. The x term can be any number or mixed number. The flow exported at 206 must equal $CO_2+2H_2O$ but can be fractionally larger for cycle balance as long as its equivalent chemical aggregate reenters the cycle for mass flow continuity.

Returning now to compressor 134 whereby the fuels for rocket engine 102 and combustor 105 are methane fractions of the design heat value, considered to be the sum of heats arriving at combustor 129 including any after-jet combustion additions. Compressor 134 receives and discharges flow 207 which is branched into 208, 209 and 210. Line 208 goes into combustor 105 and its main function by proportion is to govern the inlet temperature of combustor flow 209 into turbine 108 over suitable range for recycle balance whereby the fraction of flow 210 becoming 211 is optional on balance from zero flow to a maximum equal to that of 210. It follows then when 210 is something greater than zero on balance, it is held on zero for start-up. The compatibility of the rocket engine, or in combination with downstream after-jet combustion propulsions depends on the difference between the top pressure in combustor 102 and the design pressure for combustor 129. Combustors 102 and 129 make up more than just marginally the following head losses:

1. Rocket Engine Nozzle
2. Friction
3. Propulsion Entrainment
4. Rocket Engine Compressor Means Exhaust Distribution In effect these losses convert to heat in situ between combustors 102 and 129 and thereby convert to useful fuel endothermically with some rise in sensible heat in the products flowing to combustor 129.

At least in the foreseeable future, advanced gas turbines are designed for temperatures up to 2800 F. with blade cooling and combustor pressure up to 30 atmospheres. This invention has no practical high limit for the stagnation pressure in combustor 102, even if advanced gas turbines are planned for much higher pressures than 30 atmospheres, or higher pressure process hydrogen uses are available.

In view of these boundary conditions the stagnation pressure difference between combustors 102 and 129 must also be reconciled with the endothermic heat requirement for the transformation and the sensible heat content or the product fuel gas and the aerothermochemical propulsion design. This heat utilization must primarily take into account that portion of the exhaust heat from the turbine and the heat of compression that delivers it to the rocket engine—conserved energy reactor sequence. For example, in applications where there is a large difference in pressure between combustors 102 and 129, it is more exergetic for the rocket engine compressor means to deliver the exhaust gases to the entrainment train toward the lower end of the pressure cascade but still above design pressure at 129.

On the other hand, when the pressure at 129 is well below the high pressure that the state of the advanced art (i.e. 30 atmospheres) for gas turbines, like 20–25 atmospheres, then the preferred mode is to operate the flow at 212 through compressor 213 at maximum (i.e. equal to 210). This relates to zero flow at 211 and simplifies the cycle balance with respect to consistent chemical aggregate in mass flow.

Besides considering how varying the foregoing flow effects the design pressure at combustor 129, the main criterion is ultimately choosing a cycle balance that achieves the most net work output from the turbine means with the most recovery from recycling a related optimum of exhaust gases. This criterion requires iterating the design pressure to a value lower than 30 atmospheres, as for applications at lower pressures for retrofitting existing gas turbines operating up to 25 atmospheres. This will be covered further in the next embodiment.

Returning to the rocket engine compressor means, the fuel fraction, line 316, is sized for compressing the selected mass flow through compressor 134. Since the internal second law irreversible heats are adiabatically conserved, ideal isentropic relations can be used at least as a first approximation for determining the net work from turbine expansion.

To illustrate turbine inlet temperature control and the recycle functions of this invention, the simpler mode whereby $CH_4$ is fired without transformation follows:

$$CH_4 + 2O_2 + 4.5[CO_2 + 2H_2O] \rightarrow \{CO_2 + 2H_2O + 4.5[CO_2 + 2H_2O]\}$$
$$\Delta H = -191.7 \text{ kcal at 2515 F.}$$

Liberty is taken for simplicity and as a safe side analysis of the turbine work for the above, by using Keenan and Kaye Gas Tables for 200% Theoretical Air. This represents one pound mole of any gas at 2515 F. and 25 atmospheres expanded to one atmosphere and 943 F.:

| 25 atmospheres | 2515 F | $h_1 = 23753$ Btu/pound mole of products |
|---|---|---|
| 1 atmosphere | 943 F | $h_2 = 10275$ |
| | | $h_3 = 13478$ |

$h_3$ represents the ideal expansion work of the turbine.

200% theoretical air relates to a combustion product average molecular weight of 28.9 whereas the average for $5.5[CO_2 + 2H_2O]$ is 26.7. The safe side value for determining the Btu/pound of product is 28.9. The lower value for this follows:

$h_3 = 13478/28.9 = 466$ Btu/pound of products
Total Products Heat = 440 pounds × 466 Btu/pound = 205040 Btu
Turbine Work Efficiency = Products Heat/Heat Content of 1 mole of
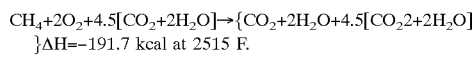
or approximately 60% with respect to one mole of methane The theoretical minimum for recovery requires the steady state fuel input to be equal in heat to the work of expansion. This is 60% for this example and relates to 13478 Btu/pound mole of products expanding through the turbine means, simply referred hereafter as the turbine.

The objective is to develop a stagnation pressure in the jet combustor that is well above the turbine inlet pressure, which is taken here as 25 atmospheres. A further objective, preferably is to arrange for a substantial part of the recycle flow to be compressed by jet propulsion in the near-adiabatic path hereinafter called the tunnel, from the jet combustor to the turbine inlet.

This is to take advantage of the 5000 F. thermodynamic potential not feasible with rotating compressors. The lesser efficiency in momentum transfer is offset because the rise in sensible heat is contained for expansion so long as the stagnation pressure driving the jet is adjusted upward, and it can be, to deliver the designed turbine inlet temperature.

The foregoing operation requires two parallel compressors instead of compressor 134 shown, whereby one compressor delivers a smaller part of recycle flow at a pressure well above the turbine inlet pressure into jet combustor 102 to augment the combustion products and thereby increase the mass entraining force of the jet. The other compressor delivers the larger portion of the recycle flow into one or more secondary ports of the tunnel at pressures somewhat less than the turbine inlet pressure to be entrained and boosted in pressure by the jet mass and further as necessary downstream by after-jet propulsion.

In a simpler mode, the flow from compressor 134 is divided so that the lesser flow is directed to the jet combustor and the larger flow at the same pressure can be directed just down stream from the jet into one or more secondary ports of nozzle section 121, or be further subdivided for flow into ports 111, 112 and 113 along the tunnel. In this mode, jet power is increased as necessary by increasing the stagnation temperature of the jet combustor.

Another alternative embodying some of either or both functions of the foregoing modes with the distinct difference that the tunnel entry pressure of the recycle flows be somewhat less than the turbine inlet pressure and that the jet combustor be independently powered by fuel and oxygen at any suitable temperature and pressure within the design limits of the rocket engine where its pressure is independently developed by one of the compressors in parallel (earlier described and not shown) and consistently the pressure of the recycle flow would be independently developed by the other parallel compressor.

The foregoing modes illustrate the wide range of operations to be selectively determined and optimized by computer analysis and tunnel design based on advanced gas dynamics for jet propulsion. The objective is to apportion the fuel required for the recompressor distribution with respect to:

1. The intermediate compressor means
2. The rocket engine stagnation temperature and pressure
3. Tunnel jet propulsions all in consideration of the portion of exhaust to be recovered and recompressed within the cycle.

The following continues the previous example for the case whereby all the recompressions to 25 atmospheres take place in the intermediate compressor means and 50% of the exhaust is selected for recycle and heat recovery.

| | Mass (Pounds) | Related $CH_4$ (moles) |
|---|---|---|
| 1. Recycle 50% as 2.75 [$CO_2$ + $2H_2O$] and split same into two flows of 1.375 [$CO_2$ + $2H_2O$] | | |
| 2. Total exhaust mass 5.5 [$CO_2$ + $2H_2O$] | 440 | 1.0 |
| 3. 1/2 exhaust mass 2.75 [$CO_2$ + $2H_2O$] | 220 | |
| 4. 1/4 exhaust mass 10375 [$CO_2$ + $2H_2O$] | 110 | 0.25 |
| 5. Flow (3) is compressed isentropically by compressor 134 | 220 | 0.5 |
| 6. Flow (5) is divided equally 1.375 is delivered at 2515 F. turbine inlet temperature | 110 | 0.25 |
| 7. The other half 1.375 is delivered to combustor 108 for turbine inlet temperature control, i.e. 1.375 [$CO_2$ + $2H_2O$] | 110 | |
| along with fuel 0.500 [$CO_2$ + $2H_2O$] | 80 | |
| product (5) | | |
| 8. Together equal 1.875 [$CO_2$ + $2H_2O$] | 190 | |
| 9. Exhaust (8) is recompressed by additional fuel flowing sequentially into combustor 108 for 190/440 = 0.43 | 190 | 0.43 |
| 10. However 0.43 [$CO_2$ + $2H_2O$] is additionally recompressed in-situ as 34.5 pounds | 34.5 | 0.08 |
| 11 Total mass and fuel used for said recompressions: | | |
| (5) | 220 | 0.50 |
| (9) | 190 | 0.43 |
| (10) | 34.5 | 0.08 |
| | 444.5 | 1.01 |
| 1.01 × 440 = | 444.4 | |

Note: Although the foregoing recompressions are shown to take place with no rocket engine recompression, the analysis nevertheless equates to the total fuel which is required no matter how the recompressions are divided (for this example) between the rocket engine, the intermediate recompression means and down stream jet propulsions.

Although oxygen power is preferred, air is not precluded. A parallel example with respect to one mole of methane gives:

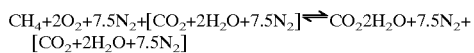

This represents a mass flow through the turbine of 580 pounds. Again using work output, $h_3$=13478 Btu/pound mole/28.9=466 Btu/pound.

Total heat flow 580 pounds×466.4=270512 Btu

Turbine Work=(270517/344160)×100=78.6% with respect to one mole of methane.

The recovery procedure with air is similar to that described for oxygen. However if half the exhaust heat and related mass is conserved i.e. 21.4%/2=10.7%, then the work output becomes 78.6+10.7=89% of the heat content of one mole of methane.

The reason the air mode in these comparisons is more efficient than the oxygen mode is because the mass flow is proportionately larger. The mass flow in each case was computed on the basis of the same turbine inlet temperature of 2515 F. and 25 atmospheres whereby the heat capacity of 440 pounds of the [$CO_2$+$2H_2O$] function is significantly greater than the [$CO_2$+$2H_2O$+$7.5N_2$] function. This points up another great advantage of the oxygen mode i.e. by increasing the mass flow of oxygen mode to that of the air mode the same work output of 78.6% would develop with the same heat recovery for a total of approximately 89% but a commensurately lower turbine inlet temperature for the same power and therefore more beneficial in turbine design.

The following can be further deduced from the foregoing analysis:

1. When a thermal efficiency somewhat less than 100% is shown for a continuous mass flow (as 440 pounds in the example), then the increased fuel and compression heat representing 100% must redound in an increased turbine inlet temperature. So, if the designed turbine inlet temperature is at the metallurgical limit, then the recycle and recompression must be recast to comply. Otherwise the increased temperature results in more turbine output work at steady state loads.

2. On the other hand, as a corollary to step 1 by recycling more exhaust than exemplified, the mass flow from recompression flow additions will increase over the 440 pounds and disrupt the required continuity for steady state recycle. In this case the surplus representing surplus heat can be transformed into fuel and be bypassed to contribute to the fuel requirement for any one or more for the rocket engine via the intermediate compression means, and jet propulsion operations.

3. When transformation of carbonaceous matter is introduced (which can be methane) into step 1 or 2, the result is more fuel and/or more heat which must be taken into account.

4. Except for exhaust portion which is not recycled and its heat content which can be independently used, the recycle part of the exhaust and all its recompression heat and fuel additions are adiabatically contained and must be taken into account in the heat and material balance for turbine flow continuity with surplus heat and mass bypassed as converted fuel to replace a corresponding amount in the base analysis. The by-pass is necessary to preserve said continuity of turbine flow.

The foregoing analysis demonstrates that methane or any clean fuel can be processed according to this invention without transformation by recycle of a substantial part of the turbine exhaust, its heat recovery being adjusted for turbine inlet temperature control and continuity. Further, this invention provides for heat and pressure for turbine expansion or transforms said heat and pressure into fuel for said expansion by a staged engine operation from which practically no shaft output work is delivered, but which converts all shaft work in-situ into heat and pressure for said expansion directly or indirectly by transforming carbonaceous matter into fuel in a near-adiabatic control volume. In other words, this is a near total energy control volume whereby all energy sources entering result in a flow with heat and pressure being delivered for turbine expansion or fuel for turbine expansion.

This invention is not limited to how the recovery of export mass and heat is obtained. An extraordinary recovery can be made by short circuiting a fraction of the turbine exhaust by-passing the mass flow 203 through compressor 205, becoming hotter flow to 203. This flow is proportionately distributed so that the heat recovery between one or more stages preferably, but not necessarily, equalizes the flow between stages of turbine means 200.

Further, selected mass flow 203 not only adds heat at selected interstage locations, but more significantly it admixes, boosts pressure selectively and augments parent flow 214, passing as distributed through the stages of turbine means 200. To maintain continuity, constant mass 203 branches off augmented flow 202, so that 202 then becomes flow 204 which sequentially becomes remnant exhaust flow 207 after flow 206 is bypassed for heat recovery indirectly within the cycle or exported for plant use. A particular advantage of the short circuiting cycle is to increase the work output without disrupting the mass flow continuity essential in the main cycle.

Case 2—Rocket Engine Power Source for Turbines with Parasitic Shaft Work

Figure 3:
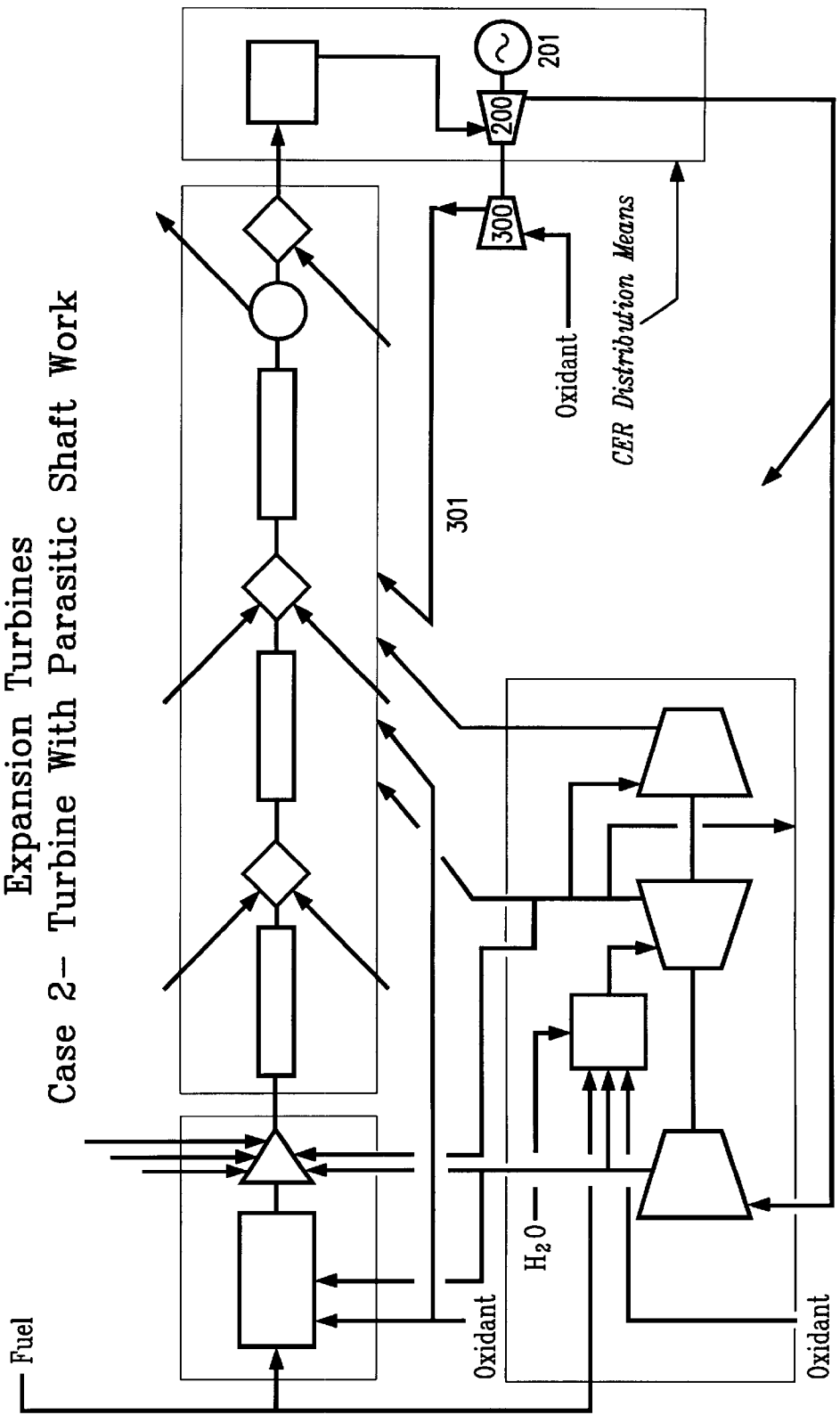
FIG. 3 is a diagram of a rocket engine power source flowing to an expansion turbine which is part of an existing gas turbine with productive use of its connected compressor.

FIG. 3 shows this embodiment whereby the rocket engine power source is applied to existing gas turbines and the flow from the conserved energy reactor is directed for clean-up at low pressures. Case 1 was presented, for transformations wherein the carbonaceous matter flowing into nozzle 120 via line 124 is either pre-cleaned or clean at the start. In this case, clean-up is presumed necessary and this requires that the flow from the conserved energy reactor is discharged at whatever pressure and temperature is needed to accommodate any one of several commercially available processes.

Hot gas clean-ups operating at about 1000 F. are preferred, because the cleaned gas at this temperature can then flow to the gas turbine at least retaining this level of heat. On the other hand, the advanced kinetic activity previously described for this invention can complete transformation reactions at very low temperatures without heat degradation from quenching. A further advantage for example, is that the carbon dioxide fraction in the fuel gas can be extracted at lower temperatures and pressures for other uses.

In these cases the conversion efficiency employing the rocket engine powered conserved energy reactor can be better than 90%. This reduces fuel cost compared with current practice. Further, when a low cost residual oil or petroleum coke can be substituted for natural gas, fuel cost can be reduced an additional 50 to 250% or more, depending on market prices.

It is also appropriate for this case to consider the benefits of servicing a retrofit operation with a clean or pre-cleaned fuel. This brings into play much of the process described in Case 1.

FIG. 3 illustrates a process wherein all or most of the load of standard compressor 300 is relieved so that in effect standard gas turbine 200 is transformed into a free-power turbine whereby the former load of turbine 200 now becomes additional power output at 201.

Accordingly, the compressor 300, only as a matter of convenience, can be used for low pressure oxidant flows into the conserved energy reactor through line 301.

Case 3—Multiple Turbine Arrangements

Figure 4:
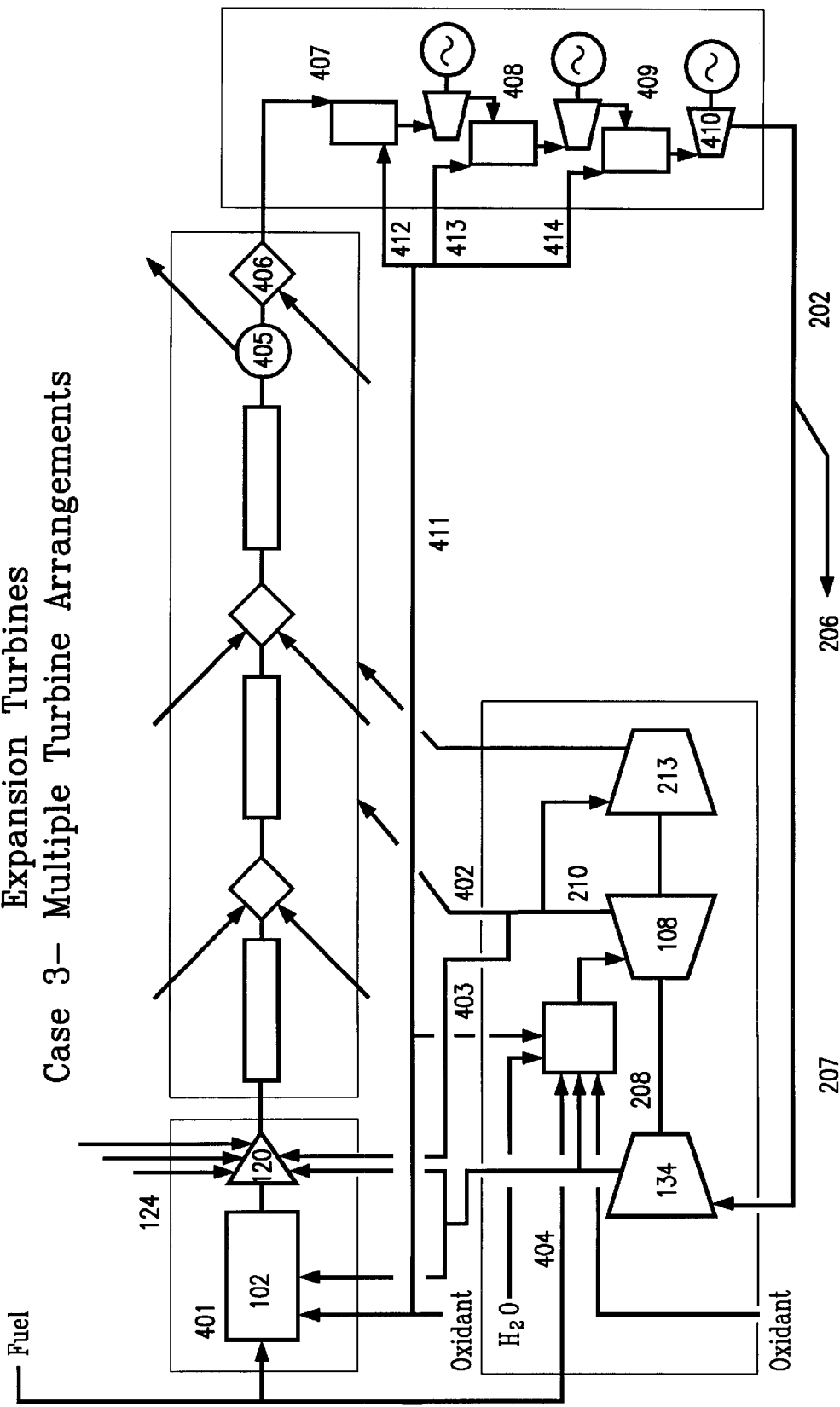
FIG. 4 is a diagram depicting the rocket engine power source flowing to three expansion turbines in series interspersed with separate combustors with independent oxidant supplies from the rocket engine compressor means.

FIG. 4 shows a multiple turbine embodiment whereby recycle for turbine inlet temperature control is optimized. The use of oxygen is also effective when applied to multi-stage turbines by this invention.

Several process modes are described:

A. First consider partial oxidation of methane by thermochemical transformation for direct interchange with recycle turbine exhaust gases. Some methane is fired in combustor 102 through line 401; the remainder is fired through line 124. The recycled exhaust gases are compressed at 134 and first proportioned so that compatible flow 208 is sized for the turbine inlet temperature of turbine 108. Accordingly, compatible exhaust 210 is largely compressed in 215 and delivered at high pressure along the conserved energy reactor. The remaining lesser flows 402 and 403 can be optionally applied or turned off. The remaining large part of compressor discharge 404 is then divided to suit the temperature and pressure interaction between combustor 102 and jet entrainment nozzle 120. The reaction zones can be applied as needed. Separator 405 is omitted. Nozzle 406 provides the back pressure for the flow on to top combustor 407. The partially oxidized gas continues on through combustors 408 and 409 to exhaust from bottom turbine 410 in complete combustion to exhaust in line 202. Oxygen is supplied through line 411 and controlled for flow content and pressure (not shown) into lines 412, 413 and 414. The control is for maintaining preferably equal temperatures at each interstage to match the temperature in combustor 407.

B. Methane can also be fired with a shortage of oxygen resulting in gas flow that is partially oxidized and be treated as explained in A above.

C. The thermochemical activity between methane and steam can vary depending on temperature and pressure. Either of the following reactions can be obtained over a wide temperature range:

$$CH_4 + H_2O_{(g)} \rightleftharpoons CO + 3H_2 \qquad \text{Equation (1)}$$

$$CH_4 + 2H_2O_{(g)} \rightleftharpoons CO_2 + 4H_2 \qquad \text{Equation (2)}$$

However the reactivity with coal/carbon can be applied to the process:

$$C + H_2O_{(g)} \rightleftharpoons CO + H_2 \qquad \text{Equation (3)}$$

$$CO + H_2 + H_2O_{(g)} \rightleftharpoons CO_2 + 2H_2 \qquad \text{Equation (4)}$$

All the foregoing reactions are endothermic and operate within the heat and reactant content of the recycle part. In this way the cycle first yields the endothermic heat and reactant steam for the transformation and then regains it when the product fuel gas is fired downstream. The reaction equilibrium is well served by the abundant water vapor content of the recycle part.

Figure 5:
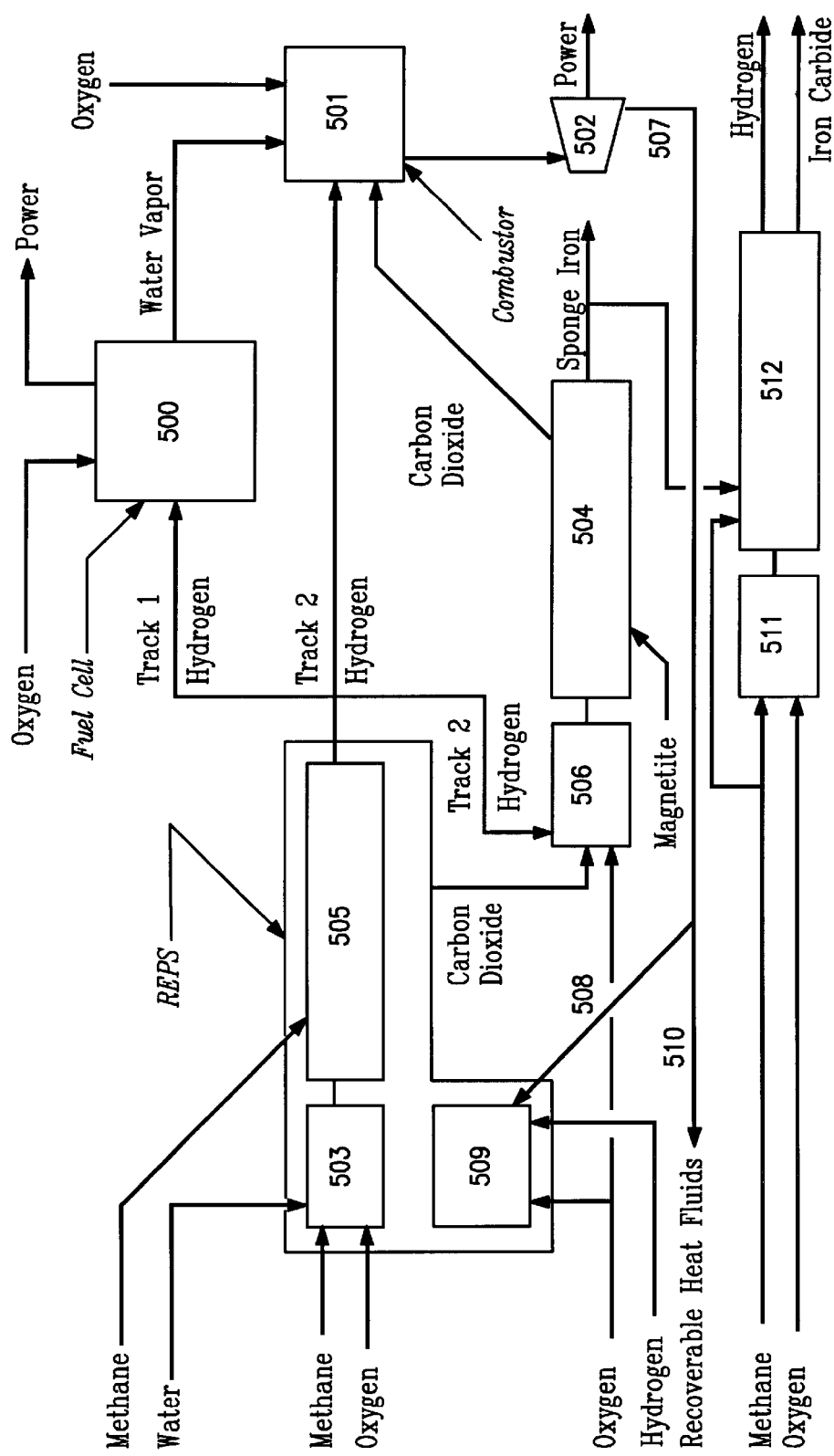
FIG. 5 is a diagram depicting a rocket engine power source in combination with a fuel cell and a second conserved energy reactor and an expansion turbine to optimize the base load and/or peak load for power delivery.

FIG. 5 shows an embodiment whereby the production of hydrogen is preferably accomplished via steam—iron reactions. Either of the following three ways are described for their different physical effects in reaction equilibrium and kinetics with respect to how the iron product can be later stored and used:

A. Reduction of $Fe_3O_4$ to FeO for Hydrogen

B. Reduction of $Fe_3O_4$ to Fe (sponge iron) for Hydrogen

C. Carburization of Fe to $Fe_3C$ (iron carbide)

A—Reduction of $Fe_3O_4$ to FeO for Hydrogen Heat Source for and Production of the Reducing Gas Equation (1)

$$0.5C + 0.5O_2 + 1.88N_2 \xrightarrow{-47\ kcal} 0.5CO_2 + 1.88N_2$$

Equation (2)

$$H_2O_{(l)} + 2C + 0.5O_2 + 1.88N_2 \xrightarrow{+15\ kcal} 2CO + 1.88N_2 + H_2$$

Net $\Delta H = -32$ kcal

Reduction $$[0.5CO_2 + 2CO + H_2 + 3.76N_2] + 3Fe_3O_{4(s)} \rightarrow 2.5CO_2 + H_2O_{(g)} + 9FeO_{(s)} + 3.76N_2 \quad \text{Equation (3)}$$

Oxidation $$9FeO_{(s)} + 1.5H_2O_{(l)} + 1.5H_2O_{(g)} \rightarrow 3Fe_3O_{4(s)} + 3H_2$$
$$\Delta G = -93\ kcal \quad \text{Equation (4)}$$

FeO particles, derived from fairly sizable $Fe_3O_4$ particles (probably from a pellet source), offer a unique characteristic whereby the particles can lumber along forward from drag forces created by the high velocity, reacting steam exerting slip velocities up to transonic speeds. As a recycle process only the product hydrogen has to be discharged at the end of the reaction zone. It does not matter if solids recycling are a mixture of Fe and FeO particles so long as suitable means are provided to preclude agglomeration in recycle. The orientation of the reactor by this invention can assume any angle with horizontal that sustains the solid particles in flight.

An alternative mode relates to a very fine Fe particle in the 50 to 200 micron range. At the lower end close to dust in size they must be conveyed by a neutral gas, nitrogen for example, in a sealed conduit to preclude spontaneous combustion. Because of this characteristic they can be expected to develop very high reaction rates just by mixing with steam. Further comments will ensue after examining the following reactions for producing hydrogen from sponge iron, Fe:

B. Reduction of $Fe_3O_4$ to Fe (Sponge Iron) for Hydrogen
Heat Source

Equation (1)

$$0.5CH_4 + O_2 \xrightarrow{-95.8\ kcal} 0.5CO_2 + H_2O_{(g)}$$

Reforming

Equation (2)

$$CH_4 + 0.5CO_2 + H_2O_{(g)} \xrightarrow{+39.3\ kcal} CO + 3H_2 + 0.5CO_2$$

Net $\Delta H$ for (1) and (2) = $-56.5$ kcal

Reduction

Equation (3)

$$CO + 3H_2 + 0.5CO_2 + Fe_3O_4 \xrightarrow{+26\ kcal} 1.5CO_2 + 3H_2O + 3Fe$$

Oxidation

Equation (4)

$$3Fe + 4H_2O_{(g)} \xrightarrow{-35.8\ kcal} Fe_3O_4 + 4H_2$$

according to Gahimer et al (IGT experiments 1976) Equation (4) has a favorable free energy change almost linearly from $\Delta G = -20$ kcal at 125 C. to about $-3$ kcal at 925 C. The free energy changes for reactions "A" were computed from Thermochemical Properties of Inorganic Substances by I. Barin and O. Knacke. In view of Gahimer, the favorable free energy changes for the "A" reactions support both processes as achievable for hydrogen production by the rocket engine power source and the conserved energy reactor. This is not to preclude running larger particle sizes in "B" reactions while still striving for an all-Fe or sponge iron production for other uses while producing hydrogen for fuel cells and gas turbines. Such a use is sponge iron for steel mills presented next as "C."

C. Carburization of Fe to $Fe_3C$ (Iron Carbide)

The production of sponge iron is basically the direct reduction of iron oxides as described above and its use in steel is primarily to form iron carbide ($Fe_3C$). With methane, as a major constituent of natural gas, the chemical environment is described by equation (1):

Equation (1)

$$CH_4 + O_2 \xrightarrow{-64\ kcal} CO + H_2O_{(g)} + 2H_2 \quad \text{Partial Oxidation}$$

The following are the driving carburization reactions:

Equation (2)

$$3Fe + CH_4 \xrightarrow{+22.9\ kcal} Fe_3C + 2H_2$$

Equation (3)

$$3Fe + 2CO \xrightarrow{-36.2\ kcal} Fe_3C + CO_2$$

Equation (4)

$$3Fe + CO + H_2 \xrightarrow{-26.4\ kcal} Fe_3C + H_2O_{(g)}$$

The foregoing illustrates the expansive applicability of the rocket engine power source of relatively unlimited high pressure range and a 5000 F. ceiling for the rocket engine combustor as a facility for high productivity in steel mills with a coordinated process which also produces power. The combination for this is next described with respect to reactions "B" above and FIG. 5.

The sequence now is to generate for example, six moles of hydrogen independently from the above equations by transforming methane in the rocket engine power source. The hydrogen flow is divided equally into three tracks:

Track 1 delivers two moles to fuel cell 500 (preferably solid oxide fuel cells) delivering power and high pressure steam into combustor 501 which empowers turbine 502, as shown.

Track 2 delivers two moles of hydrogen directly to combustor 501

Track 3 delivers two moles of hydrogen to reduce 0.5 $Fe_3O_4$.

What follows next are the potential reactions in the first and second stage operations. The first stage produces all the hydrogen and is a pressure cascade. It empowers the second stage for the reduction of $Fe_3O_4$. The pressure developed in rocket engine 503 also delivers the off-gases in track 3 from reactor 504 into the combustor 501 for maximum heat utilization. The reactions occurring in stage 1 are:

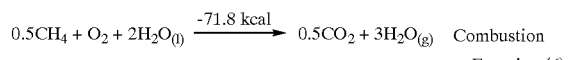

Equation (5)

Combustion

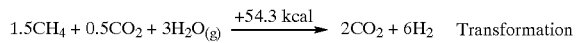

Equation (6)

Transformation

Reaction 5 takes place at top pressure inside combustor 503 so that the combustion nozzle develops a jet as needed up to transonic velocities thereby activating reaction (6) which occurs when 1.5 moles of methane are metered to react with the jet, accordingly producing in this example six moles of hydrogen equally distributed as above described to the three tracks. The carbon dioxide is separated from the hydrogen by suitable advanced means for retaining pressure and heat and directed from reactor 505 from said separation and on to empower the second stage sequence 506 and 504 for reducing the magnetite $Fe_3O_4$.

Accordingly, carbon dioxide and hydrogen flowing into jet pump 506 extend the back pressure from stage 1 through a transonic nozzle to interact with $Fe_3O_4$ particles being metered downstream of the carbon dioxide and hydrogen jet according to the following reaction (7):

Equation (7)

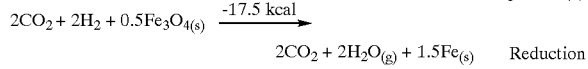

Reduction

The foregoing reactions are approximately in heat balance so that additional heat may be added as necessary for process purposes. This is simply an example of the versatility of this invention to facilitate a two stage reaction process. The jet pump 506 can readily be organized for combustion by introducing oxygen to fire a fraction of the hydrogen, and this can be the case when the carbon dioxide must be separated by a conventional solvent absorber-stripper or pressure swing adsorption system.

The exhaust from turbine 502 comprises water vapor and carbon dioxide. The flows in the process would be iterated (not done for the purpose of this example) as described in previous embodiments whereby a substantial fraction in line 507 would continue on in line 508 into rocket engine compressor means 509 and the difference in line 510 bypassed for other uses.

Returning now to the production of iron carbide and using endothermic reaction (2) for example, sponge iron and methane react with heat to yield iron carbide [$Fe_3C$] and hydrogen. As an option, this is depicted in FIG. 5 as a third stage process whereby the methane is partially oxidized in the rocket engine combustor 511. Methane may be metered in excess into the nozzle section of combustor 511 or metered down stream into nozzle sections of sponge iron reactor 512 The jet from combustor 511 accordingly supplies the endothermic heat of reaction to produce are iron carbide and hydrogen. In alternate modes the hydrogen produced from reactor 512 can be recycled to the nozzle sections of combustor 506 and reactor 504 to reduce $Fe_3O_4$ and/or FeO to sponge iron thereby minimizing carbon dioxide production.

In conclusion for this embodiment two further points are made. Firstly, a full power plant or peak load requires operating tracks 1 and 2 together. In this way the turbine can be organized to handle the base load on track 2 alone. Secondly, sponge iron can be commercially made into pellets or briquettes which can be conveniently ground into powder form. The reactivity of fine iron particles with steam can produce $Fe_3O_4$ and pure hydrogen. This can be more suited for small fuel cells for residences, for example. Polymer electrolyte membrane fuel cells are commercially being developed for this purpose as well as somewhat larger units for commercial buildings or mobile power sources. This class of fuel cell minimizes high temperature components in dwellings and confined spaces. This invention can produce the sponge iron for these or other fuel cell types with relatively small reactors for portability and security as well as the aforementioned larger scale operations.

We next describe the rocket engine power source applied in two ways for boilers and steam turbines.

The Steam Turbine Power Cycle—General Considerations

Figure 6:
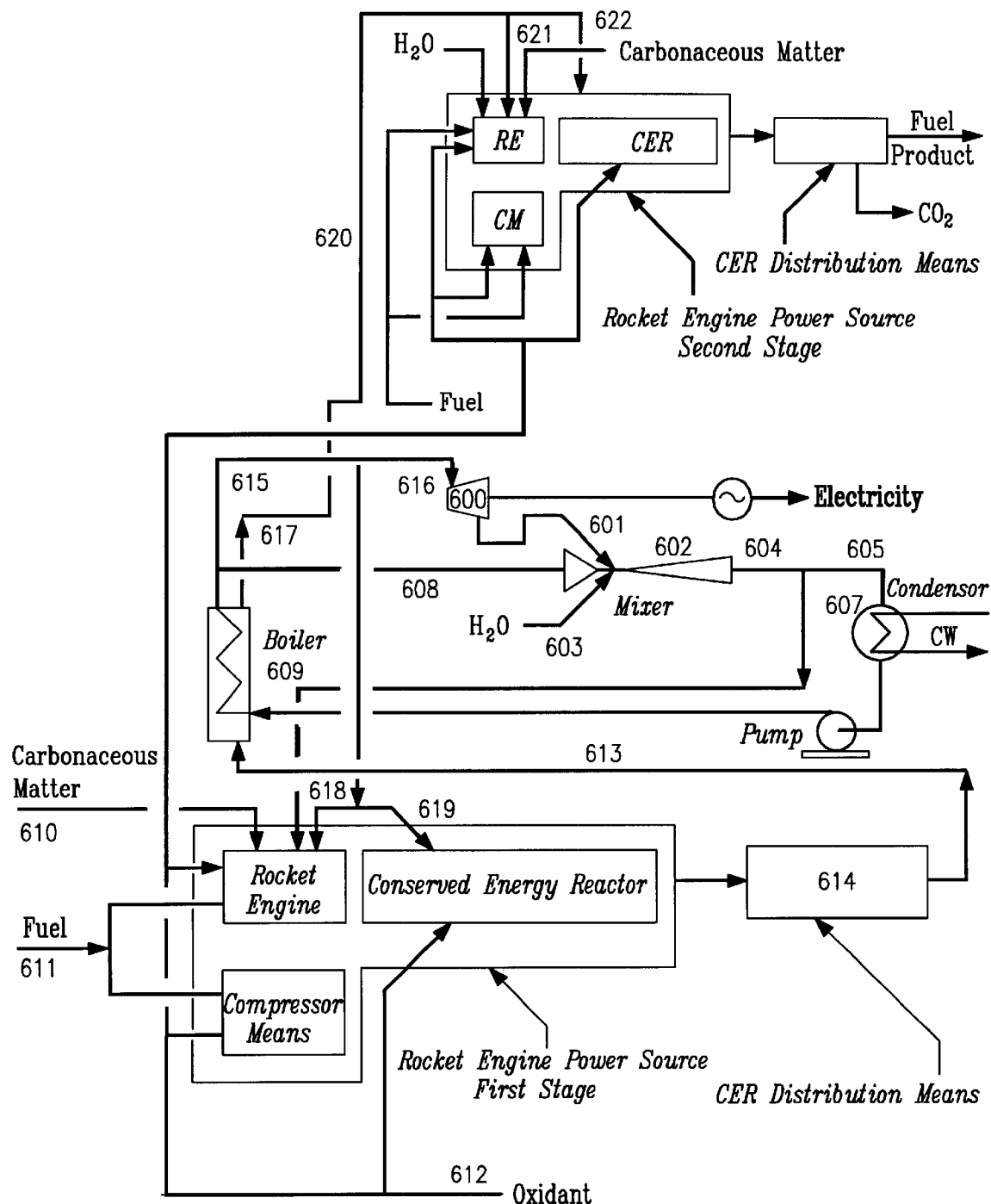
FIG. 6 is a diagram depicting a rocket engine power source integrated with a boiler and using two stage fuel transformations.
Figure 7:
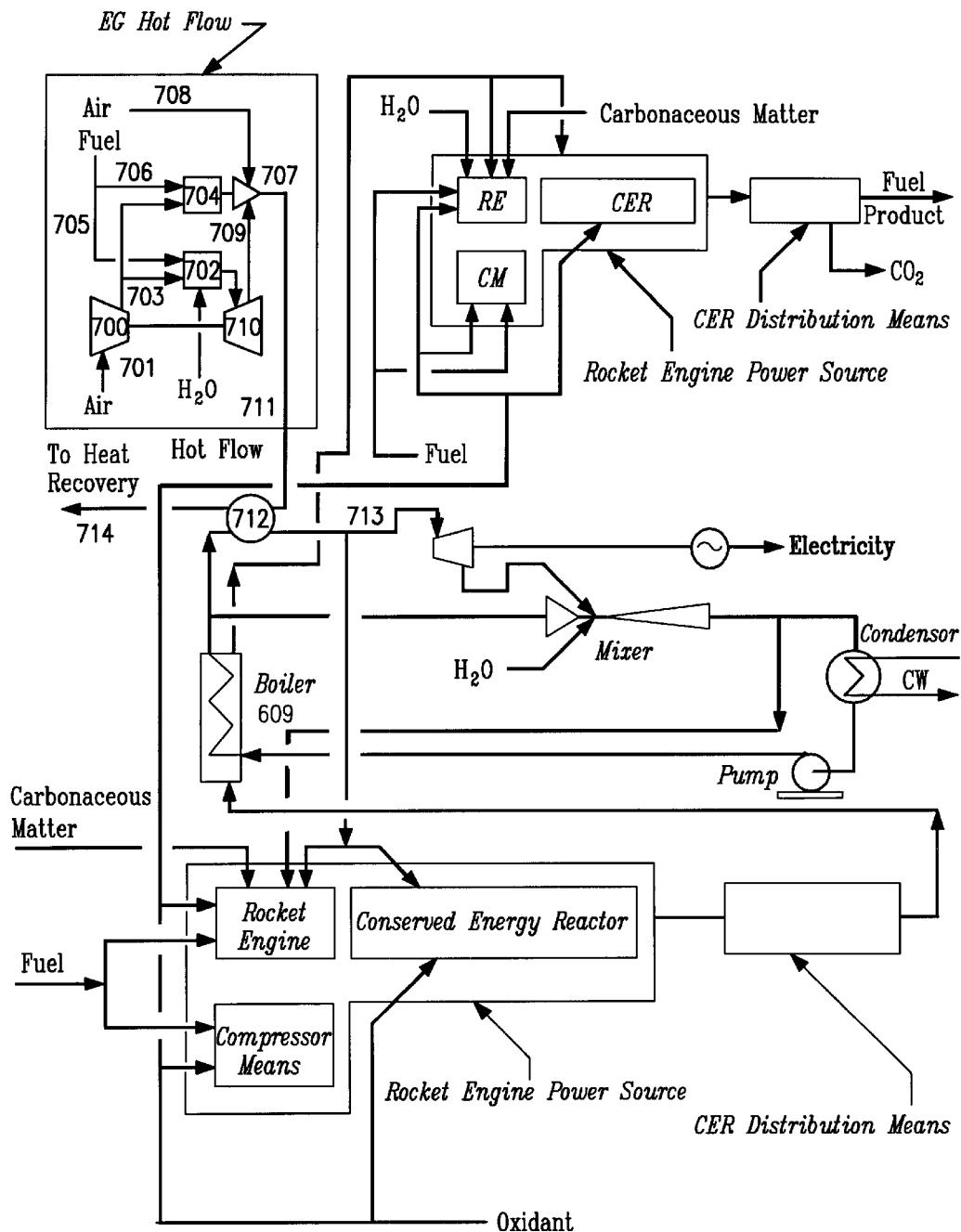
FIG. 7 is a diagram depicting a rocket engine power source and a boiler with a hot gas flow extension to further improve system efficiency.

Refer to FIGS. 6 and 7 which are later described in detail. Typically steam turbines in boilers are without connected compressors. As an example, a steam turbine generator producing 50 MW would be powered by a boiler delivering approximately 346,000 pounds of steam per hour at 600 psia and 1000 F. with an exhaust from the turbine at 250 F. and 30 psia as dry saturated steam containing 1517 Btu per pound. Entropy is approximately 1.7 Btu/pound R.

At constant entropy, the theoretical efficiency, neglecting pump work, is calculated as follows:

$$E=\{[1517-1164]/[1517-218]\}\times 100=27.2\%$$

The efficiency represented sets the point of departure between existing or new installations planned on the Rankine Cycle and this invention. The objective here is to recover most of the heat into the conserved energy reactor for converting and developing all the fuel, retaining recovered heat for firing the boiler. In completing the cycle, the efficiencies of the boiler and of the transmission of power between the turbine and generator will remain substantially unchanged. However, the inner cycle gain in entropy increasing the exhaust enthalpy will be recovered in the conserved energy reactor which will receive the exhaust steam directly as the major companion reactant with carbon and hydrocarbon compounds.

The latent heat in the turbine exhaust represents the largest part of the waste energy. At least 50% of it is recoverable by inter-mixing an additional flow of water with the turbine exhaust steam on a one to one basis. If all the latent heat is recoverable at this point in the process then the usual boiler efficiency of about 90% (100% for simplicity) would also hold as the overall thermal efficiency for the advanced operation. However the 27.2% efficiency shown above also represents the overall thermal efficiency of a current operation. The lost energy is 72.8%, which for practical purposes is the latent heat loss to cooling water. By recovering 50% this, as above described "E" becomes:

$$E=27.2+36.4=63.6\%$$

The net work is nominally unchanged as 50 MW or 27.2% of the heat flow to the turbine. The fuel economy is greatly increased so that 36.4% less fuel is needed to produce the same net work. Further, the cooling water requirement is cut in half and the additional water, 50% saturated after inter-mixing is next used as the major water vapor reactant as $2H_2O$ into the conserved energy reactor shown for example, with $CH_4$ by Equation (1)

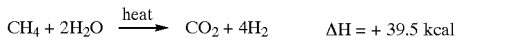

$$CH_4 + 2H_2O \xrightarrow{heat} CO_2 + 4H_2 \qquad \Delta H = + 39.5 \text{ kcal}$$

For this analysis and in general two moles of steam can represent all the steam that the boiler supplies as 100% and all for the turbine. It is therefore consistent to recover as much heat from two moles of turbine exhaust by the inter-mix flow transfer, above described, by relating to two moles for continuity of mass whereby two moles of exhaust continue on to the condenser and two additional moles with half of the latent heat go into the reactor which supplies the fuel to the boiler. The added water must at least be as pure as the turbine exhaust so as not to contaminate the flow to the condenser.

The two moles of water vapor are thereby converted to fuel in the power source. The fuel is next fired to provide 100% of the heat to the boiler by Equation (2)

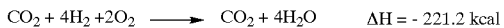

$$CO_2 + 4H_2 + 2O_2 \longrightarrow CO_2 + 4H_2O \qquad \Delta H = -221.2 \text{ kcal}$$

whereby the combustion products $CO_2+4H_2O$ are stack gases (for cleanup as necessary) to become the heat source in near adiabatic flow for a second stage power source which can provide additional fuel at any pressure for any purpose for immediate use and part of which can be recycled to power the rocket engine and or rocket engine compressor means for either or both first and second stage reactors.

It is preferable that in the foregoing staged operations the engines are fired with a clean fuel like methane and that at least in stage one the carbonaceous matter is also methane or an equally clean and compatible fuel.

The following reaction(s) demonstrate the escalating benefit of stage two:

Equation (3)

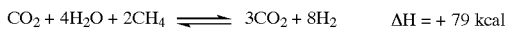

$$CO_2 + 4H_2O + 2CH_4 \rightleftharpoons 3CO_2 + 8H_2 \qquad \Delta H = +79 \text{ kcal}$$

The effect of firing is shown by:

Equation (4)

$$3CO_2 + 8H_2 + 4O_2 \longrightarrow 3CO_2 + H_2 \qquad \Delta H = -462.4 \text{ kcal}$$

By comparing the combustion heat releases from Equations (2) and (4) with the endothermic requirements of Equations (1) and (3) it is fairly obvious that there is abundant fuel available apart from exhaust heat recovery both as latent and sensible heat from turbine exhaust and stack gases to further supply hydrogen recycle for the rocket engine and compressor combustors. The carbon dioxide part may be retained or separated and by-passed by suitable means.

A yield of eight moles of hydrogen is considered a maximum and the yield may be considerably reduced by lowering the flow of stack gases for the second stage reactor and directing the difference to low grade heat uses. On the other hand this mode, without or with less use of a second stage power source, can apply the first stage in the use of other carbonaceous less costly and/or less clean feeds which depend on in-situ boiler or stack clean-up.

Case 5—Rocket Engine Power Source Integrated with Boiler

FIG. 6 is now described in compliance with the foregoing operations. FIG. 6 shows this embodiment in which a rocket engine power source is integrated with a boiler utilizing the two stage fuel transformation. Steam exhaust from turbine 600 via line 601 flow into mixer 602 for direct heat interchange with clean water, through line 603, which is metered and pumped (not shown) to boost as necessary the flow through the mixer 602. The mixed flow 604 divides into flows 605 and 606 so that flows 601 and 606 are massmatched (control not shown) to preserve boiler feed water continuity through condenser 607 at a controlled low pressure which also boosts the mixed flow 604 through the mixer 602. As a consequence bypass flow 606 matches the mass content of clean water inflow 603. Mixer steam flow 608 from boiler 609 joins the mixed flows 601 and 603 to bring the clean water flow 603 at least up to the point of vaporization. The minor steam quantity for this purpose becomes part of and increases bypass flow 606 over said massmatched condition, which now as a partly saturated vapor is directed into a downstream port of rocket engine nozzle section 120 (not shown). Increased flow 606 accordingly becomes the major $H_2O$ reactant with carbonaceous matter 610 in the first stage power source. The fuel 611 can be any fuel but clean fuels such as methane or natural gas are preferred for two stage operation. The oxidant 612 is preferably oxygen for the first stage of a two stage operation. The power source discharges fuel product 613 through distribution means 614 which can be the fire box of boiler 609 or simply deliver the fuel product to the boiler's fire box away from said means.

The boiler delivers steam 615 which supplies minor bleed 608 (previously described) and which can be further divided into a steam flow 616 which directly powers turbine 600 and discharges optional flow 617 which is divided into flows 618 and 619 to suit make-up steam requirements. The optional flow 617 of course requires additional fuel supply 613 over what is necessary for torbine power.

There is a second more dominant option for flow 618 whereby the Compressor Means is eliminated and combustion is precluded inside of jet combustor 102 shown in FIG. 1 and now 618 (up to full boiler pressure) empowers the jet so that the Rocket Engine is replaced by a powerful steam jet pump. However, combustion is not precluded downstream of the jet and can be applied for increasing the temperature and thrust of the downstream flow. This feature, though not shown, can be applied to the second stage Power Source in this embodiment and likewise in the FIG. 7 embodiment.

Continuing now with FIG. 6, steam rich stack gases 620 pre-cleaned as necessary inside boiler 609 or outside (not shown), can be divided into flows 621 and 622. Flow 621 is directed into a port of nozzle section 120 (shown in FIG. 1) just down stream of the jet. Flows 621 and 622 are adjusted to suit the reactivity with flow 622 being directed accordingly into the conserved energy reactor. All other aspects of the second stage reactor are similar to those of stage one and generally of the Power Source described in FIG. 1.

Case 6—Hot Flow Extensions of Boiler Embodiment

FIG. 7 shows this embodiment whereby a boiler arrangement is used with a Hot Flow extension to further improve system efficiency. The Hot Flow Engine Gasifier is powered by a standard industrial supercharger available over a wide flow range, for large industrial diesel engines. In this application, the turbine and compressor part are interspersed with a custom built combustor designed to be fueled so that combustion products are chemically compatible and can flow adiabatically under power, practically without heat loss, except for minimal radiation for increasing the efficiency of the Boiler 609.

The turbochargers engine described is a simple cycle gas turbine and can be started by any suitable means. The turbochargers—gas turbine is preferred to an expensive conventional gas turbine (which is not precluded) because the pressures anticipated are generally predicted to be under four atmospheres.

Referring to FIG. 7 the hot flow unit compressor 700 receives air from line 701 and delivers part to combustor 702 from line 703 at top pressure. The remaining air is delivered at the same pressure to combustor 704. Combustors 702 and 704 are separately fueled by lines 705 and 706 respectively by any compatible fuel, but preferably hydrogen in the ration of 4 to 1 with carbon dioxide, which can be supplied by the second stage rocket engine power source. The products accordingly have high emissive potential for radiant heat transfer. The products from combustor 704 discharge through a sonic nozzle in conjunction with secondary ports which comprise nozzle entrainment unit 707. The nozzle is integral with the combustor and the secondary entrainment ports which separately receive ambient air 708 and exhaust gases 709 from turbine 710.

Extremely hot gases (2000 F. and higher) emanate as mixed flow comprised of combustion products from 704, ambient air 708 and turbine exhaust 709 coming together in channel by suitable means and continue as flow 711 through heat exchanger 712 which further super-superheats the boiler steam 713 to 1600 F. and higher. The exit flow 714 can be deployed for further recovery by conventional heat transfer means to suit various boiler needs.

The foregoing completes the hot flow cycle which for practical purposes is 100% heat utilization efficient except for minimal radiation and whereby the turbochargers—gas turbine power, converting to heat in-situ, becoming intrinsically part of the total heat, comprises a total energy conversion adjunct to Boiler 609.

The hot flow velocities are planned to be very high so as to greatly increase the heat transfer rate in exchanger 712. This is a total energy system whereby the turbocharger gas turbine's power heat equivalent is totally conserved, resulting in extremely high heat transfer rates because the power for generating the necessarily very high velocities is conserved. As a consequence the ultimate benefit is a relatively smaller heat exchanger. Flow velocity, the essential factor, requires power which rises as the cube of the velocity. Power here is not a cost factor because it is conserved, as already explained. Accordingly, by combining this intense heat transfer by convection with the previously described highly emissive radiation, heat fluxes up to 90,000 Btu per square foot per hour and higher can be obtained.

The hot flow extensions to the conserved energy reactor described above effectively create a total water and energy recovery system. Investment costs are minimized by the very high heat fluxes thereby greatly reducing the surface area in exchanger 712. Water and its contained energy is internally recycled; the turbocharger gas turbine's power heat equivalent is totally conserved; the energy required for high velocity heat transfer (which rises as the cube of the velocity) is not a factor here because it is conserved, as already explained. The principle advantage of increasing the steam temperature to about 1600 F. and higher is that this substantially increases the turbine output while still retaining the conserved energy benefits of the two stage system and the flexibility of being able to transform considerably less costly fuels into more useful products. Of course it is also possible to add the hot flow extension to the fuel cell arrangements described in FIG. 5.

Referring back to and extending the 50 MW example, the following demonstrates the Hot Flow gain from just a 400 degree rise to 1400 F., based on a nominal specific heat of 0.5 Btu/pound F:

$$E'=[(1717-1164)/(1717-218)]\times 100=36.9\% \text{ for 68 MW}$$

compared with 27.2% for 50 MW. The numbers speak for themselves. Every dollar for fuel heat energy spent in this way is reflected in equivalent electrical energy without loss.

As apparent from the disclosure, this invention involves dispensing power in a cascade to one or more prime movers, expansion turbines for example so that the ultimate delivery is electricity or mechanical work. Within the cascade action, hydrocarbon fuels or other carbonaceous matter are subjected to an aerothermochemical driving force, a relatively unlimited stagnation pressure and combustion temperatures up to 5000 F. for delivering jets of compatible formulation to bombard and/or entrain carbonaceous matter introduced downstream. The consequence is the production of a fuel gas that is more economical and more physiochemically suitable for the prime mover. The exhaust from the prime mover is then suitable to a cycle whereby it is recompressed and delivered at top pressure to the top of the cascade. The part of the exhaust that is bypassed for export can be used to preheat the oxidant and fuel entering the cycle for the recompression of the exhaust. The fuel for recompression provides a substantial part of the top combustion pressure requirement. Similarly accounted fuel can also be applied for jet propulsion entrainment at one or more locations downstream of the top jet; that is, between the top jet and the head of the turbine or other prime mover where the fuel gas is fired at the design temperature and pressure.

The reactor can transform and provide reactant products for any purpose, with or without producing electricity. Further, waste heat can be applied to an endothermic heat requirement for many reactions similar to those described in this invention. Hydrogen and synthesis gases are provided for ammonia, methanol and other petrochemicals. Ethylene, acetylene and other cracked pyrolysis products are provided for downstream refining and petrochemical operations. Mixed reactions with solids such as iron oxides and sponge iron for steel mills and fuel cells also produce exceptional results with this invention. Finally, temperature and pressure largely are depended upon to drive reactions to completion through one or more transonic zones. By metered and controlled stoichiometry, with reactions taking place in milliseconds and with the intense gas dynamic action described, kinetic control in process operations can be developed over relatively short time spans. Metered and staged stoichionetry in a kinetically controlled reaction environment results in autothermal quenching. If desired, conventional quenching to freeze intermediate reaction species may be employed. Also, catalysts may additionally be employed to promote reaction at less severe operating conditions and achieve concurrent removal of sulfur and other pollutants.

Applying the power source described in this invention to a whole variety of electric power, chemical and other process uses can fill a great need in industry and the world.

What is claimed is:

1. A process comprising the steps of:
 a. compressing a flow of gas with a prime mover in a near adiabatic path;
 b. causing a temperature rise, due to resistance to flow within said adiabatic path, with respect to its pressure, where it enters a near adiabatic tunnel;
 c. providing at least one other gas into said tunnel at a prescribed, independently controlled temperature and pressure;

d. comingling and mixing said compressed flow with said at least one other gas;

e. forming a prescribed mass at a prescribed pressure for its temperature; and f. discharging said mass at a discharge end of said tunnel for at least one selected end use.

2. A process according to claim 1, wherein the prime mover, which compresses at least said flow of gas, is the complete source for powering said flow of gas so that said pressure is ample to entrain said at least one other gas, wherein said at least one other gas comprises at least a substantial part of an exhaust gas of the same said prime mover.

3. The process according to claim 1, wherein said flow of gas is divided into at least two parts wherein a larger flow is delivered at the pressure of said tunnel, and a lesser flow at a pressure largely higher entering said tunnel to compress at least a substantial part of the exhaust gas from said prime mover to said pressure of said tunnel.

4. The process according to claim 3, wherein said lesser flow becomes part of a mass in a combustion which further powers a jet and contributes to other energies entering the flow downstream of said jet to culminate toward the discharge end of said tunnel at a prescribed temperature and pressure for the mass flow out of said tunnel.

5. The process according to claim 4, wherein said lesser flow, at said higher pressure, is coordinated with the back pressure of said prime mover toward recovering all or most of its exhaust with its heat adiabatically contained and delivered to said tunnel.

6. The process according to claim 5, wherein oxygen, air and/or oxygen carriers are at least compressed as part of said larger flow to be delivered to co-mingle with carbon or hydrocarbon feed stocks dependently or independently delivered into said tunnel, and further so the exhaust from said prime mover is discharged at a substantial back pressure to be delivered with significant kinetic energy into or downstream of said jet to react with said fuels and said oxygen carriers, principally $CO_2$ and $H_2O$, in order to contribute to or completely provide the endothermic heat for producing hydrogen and other synthetic fuels to be partially or completely oxidized toward the end of said tunnel to power said turbines.

7. The process according to claim 6, wherein the mass of hydrogen or synthetic fuels exceeds the steady state requirement for powering said turbines, then the resulting surplus is bypassed to fuel said prime mover and/or for other in-process or plant use.

8. The claim according to claim 4, wherein said discharged mass at said prescribed temperature and pressure is expanded in a gas turbine or in one or more staged free turbines to export power, and at least a substantial portion of the exhaust gases from said turbines is recycled into said tunnel as one of said at least one other gas.

9. The process according to claim 8 with respect to said parts wherein said larger part includes a regenerator for exhaust heat recovery from said prime mover and/or said turbine so that said lesser flow supplies less fuel as part of a total fuel requirement in said tunnel as a credit for the increased heat generated in the flow through said regenerator and/or resistance functions in and/or beyond the compressor train which delivers said larger part into said tunnel.

10. The process of claim 1 wherein said comingled gases are at a quasi-isentropic temperature value for its prescribed pressure and mass, and said discharged mass is expanded in a turbine for export power.

11. The process of claim 1, wherein said comingled gas mixture is selected over a significant temperature span above the isentropic value for its prescribed pressure and mass, to provide endothermic heat and/or other heats for chemical reactivity for use in production and export of selected chemical products.

12. The process of claim 10 further comprising the steps of:

providing a turbine wherein the turbine output is substantially free for useful shaft work;

expanding a substantial portion of said discharged mass through said turbine, to provide output power; and recompressing said expanded discharged mass in stages by at least two independently powered compressors which create pressure; and wherein practically all the energy provided for said recompression is conserved in a near adiabatic tunnel including A. the heat and mass and total energy of said flow, and B. the heat and mass of the fuel fired.

13. The process according to claim 12 wherein said turbine is a combustion turbine and said heats and masses and total energy coming together are conserved in said tunnel and are driven into said turbine for expansion therein.

14. The process according to claim 13 wherein the fuel for said combustion turbine is fired with oxygen.

15. The process according to claim 13 wherein the fuel for said combustion turbine is fired with air.

16. The process according to claim 13 when the mass of combustion products expanding through said turbine is equal in mass to the mass when air is used, the work output is equal but a lower turbine inlet temperature is obtained than when using the equivalent mass flow for said air.

17. The process according to claim 16 wherein the temperature with respect to oxygen is increased to match temperature with respect to air for equal mass flows, then the output with respect to oxygen is significantly greater than for air.

18. The process according to claim 13 wherein the heat capacity for the mass flow through said turbine can be adjusted by controlled recycling and with respect to firing with oxygen control flexibility is considerably greater than said control flexibility than when firing with air, and which for the same mass, results in lower turbine inlet temperature.

19. The process of claim 13 wherein the output of the turbine is substantially increased by reducing the load of its combustion air compressor on the same shaft, by substantially eliminating said load by recompressing the greater portion of the exhaust from said turbine in a system of at least two independently powered and staged compression operations.

20. The process according to claim 11 wherein said comingled gases include methane, and said process further comprise the steps of:

partially oxidizing said methane metering an excess methane fraction or methane into down stream nozzle sections in suitable proportions for reacting with sponge iron to produce iron carbide;

delivering sponge iron into the down stream nozzle sections;

producing said iron carbide and hydrogen by reacting said methane with said sponge iron; and recycling said hydrogen to reduce iron oxide thereby producing a substantial amount of sponge iron.

21. The process according to claim 11 wherein said comingled gases include methane and largely paraffin feed stocks, further comprising the steps of:

developing a largely steam source in a rocket engine combustor;

metering said feed stock into the nozzle section of said engine and/or down stream nozzle sections;

discharging a transonic jet;

interacting said feed stock with said jet in a downstream reactor, accordingly cracking said feedstock to discharge ethylene and steam for suitable separation.

22. The process according to claim 21 wherein stagnation temperatures up to 5000 F. and higher and relatively unlimited stagnation pressures can be developed in said combustor.

23. The process according to claim 22 wherein the downstream reactor comprises two ormome optional cracking zones for flexibility in locating precise shock zones under various flow velocities and shock related pressure differences for a substantial range offered by said relatively unlimited stagnation pressure in said rocket engine combustor.

24. The process according to claim 23 wherein each of said cracking zones is preceded by a nozzle section for additional reactants and transonic flows.

25. The process according to claim 24 wherein additional shock flows can be symmetrically oriented around the central flow at critically strategic positions as sought by adjusting the synchronization of said shocks by quasi-precise control of said flows.

26. The process according to claim 25 wherein hydrogen is introduced in conjunction with said additional shock flows and said control.

27. The process according to claim 21 wherein synthesis gas is co-produced for use as a pyrolysis gas in a first stage supply, for export and in recycling as a substantial source of fuel for said rocket engine and/or said prime mover so that by difference of the total synthesis gas flow, sufficient synthesis gas is provided for the production of ethylene according to the following procedure wherein synthesis gas at high pressure is delivered in prescribed quantity into the combustor of a second stage rocket engine and fired therein to produce a suitable pyrolysis jet for cracking methane metered into said second stage nozzle section of the rocket engine and/or one or more nozzle section down stream said jet.

28. The process according to claim 27 wherein said cracking occurs at one or more shock waves.

29. The process according to claim 28 wherein supplementary shocks occur as a consequence of compatible matter as supersonic flows are directed into one or more nozzle sections down stream of said jet.

30. The process according to claim 29 wherein said supersonic flows are organized as one or more symmetrical pairs angling into and fairing into and along the main flow produced by said engine jet as admixed with a prescribe amount of ethane directed into said engine nozzle section and/or one or more said nozzle sections down stream.

31. The process according to claim 29 wherein the shock waves produced by said engine jet and/or those produced by secondary supersonic flows are suitably coordinated with respect to plausible cracking time ranges and the velocity of the main stream to take place in any one or more locations designated for the entry of said supersonic flows.

32. The process according to claim 31 wherein suitable arrangements are made to at least partially quench the product flow by use of the ports at the next nozzle section location from said cracking location thereby delivering said ethylene and some steam for either quenching and separation beyond this process.

33. The process according to claim 31 wherein carbonaceous matter is also produced in the first stage for producing the synthesis gas required for pyrolytic cracking in the production of ethylene and other petrochemicals.

34. Apparatus for generating power from fuel comprising:

a gas turbine having a combustor;

a rocket engine having a nozzle and a compressor means;

means for feeding fuel and oxidant to the rocket engine and to the rocket engine compressor means;

means for feeding carbonaceous matter and water, steam, or a mixture of water and steam, to the rocket engine nozzle;

means for processing the output of the rocket engine nozzle into fuel for the turbine combustor;

means for introducing said fuel and oxidant for the turbine to the turbine combustor;

means for recycling hot exhaust from the turbine to the rocket engine compressor means and controlling the inlet temperature to the turbine.

\* \* \* \* \*